US012772144B2

(12) United States Patent
Tiwari et al.

(10) Patent No.: US 12,772,144 B2
(45) Date of Patent: Oct. 20, 2026

(54) CORE NETWORK NODE, NETWORK NODE, METHOD FOR CORE NETWORK NODE AND METHOD FOR NETWORK NODE

(71) Applicant: NEC Corporation, Tokyo (JP)

(72) Inventors: Kundan Tiwari, Tokyo (JP); Toshiyuki Tamura, Tokyo (JP); Iskren Ianev, Tokyo (JP)

(73) Assignee: NEC CORPORATION, Tokyo (JP)

( * ) Notice: Subject to any disclaimer, the term of this patent is extended or adjusted under 35 U.S.C. 154(b) by 339 days.

(21) Appl. No.: 18/578,415

(22) PCT Filed: Jul. 12, 2022

(86) PCT No.: PCT/JP2022/027447
§ 371 (c)(1),
(2) Date: Jan. 11, 2024

(87) PCT Pub. No.: WO2023/286778
PCT Pub. Date: Jan. 19, 2023

(65) Prior Publication Data

US 2024/0298248 A1 Sep. 5, 2024

(30) Foreign Application Priority Data

Jul. 16, 2021 (IN) .............................. 202111032117

(51) Int. Cl.
*H04W 48/06* (2009.01)

(52) U.S. Cl.
CPC .................................. *H04W 48/06* (2013.01)

(58) Field of Classification Search
CPC ............. H04W 48/06; H04W 28/0284; H04W 28/0289; H04W 24/08; H04L 41/40; H04L 41/5054
See application file for complete search history.

(56) References Cited

U.S. PATENT DOCUMENTS

2024/0236912 A1* 7/2024 Velev .................... H04W 60/04

FOREIGN PATENT DOCUMENTS

EP 4068848 A1 * 10/2022 ............ H04W 28/18
JP 2022173615 A * 11/2022

OTHER PUBLICATIONS

Google Machine Translation of JP2022173615A (Year: 2022).*
International Search Report for PCT Application No. PCT/JP2022/027447, mailed on Sep. 20, 2022.
English translation of Written opinion for PCT Application No. PCT/JP2022/027447, mailed on Sep. 20, 2022.
3GPP TR 21.905: "Vocabulary for 3GPP Specifications". V17.0.0 (Jul. 2020).
3GPP TS 23.501: "System architecture for the 5G System (5GS)". V17.1.1 (Jun. 2021).

(Continued)

*Primary Examiner* — Kenny S Lin
(74) *Attorney, Agent, or Firm* — Sughrue Mion, PLLC

(57) ABSTRACT

A core network node includes means for requesting a network node for a network slice management to update the number of user equipment (UE) registered to the network slice, means for requesting the network node for network slice management to update the number of Protocol Data Unit (PDU) sessions for a specific network slice, and means for receiving, information indicating failure related to the number of the PDU sessions update.

13 Claims, 17 Drawing Sheets

(56) References Cited

OTHER PUBLICATIONS

3GPP TS 23.502: "Procedures for the 5G System (5GS)". V17.1.0 (Jun. 2021).
3GPP TS 23.401: "General Packet Radio Service (GPRS) enhancements for Evolved Universal Terrestrial Radio Access Network (E-UTRAN) access". V17.1.0 (Jun. 2021).
3GPP TS 23.700-40: "Study on enhancement of network slicing". V17.0.0 (Mar. 2021).
Generic Network Slice Template https://www.gsma.com/newsroom/wp-content/uploads/NG.116-v2.0.pdf, Oct. 16, 2019.
3GPP TS 23.503: "Policy and Charging Control Framework for the 5G System". V17.1.1 (Jun. 2021).
Samsung, "Network Slice Admission Control in EPC", SA WG2 Meeting #144E S2-2102623, online, Apr. 6, 2021, Retrieved from the Intranet, p. 2, lines 13-22.
Samsung, "Network Slice Admission Control in EPC", 3GPP TSG-SA WG2 Meeting #145E S2-2104899, online, May 28, 2021, Retrieved from the Intranet, p. 2, lines 26-28.
Zte, "Overview Introduction for EPS interworking", 3GPP TSG-CT WG4 Meeting #106-e C4-215384, online, Oct. 15, 2021, Retrieved from the Intranet, p. 2, lines 18-21.

* cited by examiner

CORE NETWORK NODE, NETWORK NODE, METHOD FOR CORE NETWORK NODE AND METHOD FOR NETWORK NODE

This application is a National Stage Entry of PCT/JP2022/027447 filed on Jul. 12, 2022, which claims priority from IN patent application No. 202111032117 filed on Jul. 16, 2021, the contents of all of which are incorporated herein by reference, in their entirety.

TECHNICAL FIELD

This present disclosure relates to a core network node, a network node, a method for a core network node and a method for a network node.

BACKGROUND ART

Network slicing feature was defined in the 3GPP release 15 and release 16 normative specifications. GSMA 5GJA has introduced in NPL 6 the concept of Generic Slice Template (GST) from which several Network Slice Types descriptions can be derived. Some of these parameters in the GST point explicitly to the definition of parameters and bounds on the service delivered to the end customer. For instance, the GST aims at the limitation of the number of PDU sessions/PDN connections per network slice, or the number of devices supported per network slice, or the maximum UL or DL data rate per network slice. NPL 5 identified and addressed the gaps that needed to be filled in providing support for the GST parameters enforcement and the suitable solutions to address these gaps. However, there are still outstanding issues related to EPS and 5GS interworking and mobility.

The Network Slice Admission Control (NSAC) procedure is defined in 5GS to manage the number of UEs registered to a network slice and also the number of PDU sessions established on the network slice. This procedure also defines a procedure to manage a scenario when a network receives a request from a UE to register for the network slice and the number of the UEs registered to the network slice meets or exceeds the quota of total number of the UEs that can be registered with the network slice at one point of time. Similar procedure is also defined for the scenario when the network receives a request from the UE to establish a PDU session on the network slice and the total number of the PDU sessions established on the network slice already meets or exceeds the quota of total number of the PDU sessions that can be established on the network slice.

CITATION LIST

Non Patent Literature

[NPL 1] 3GPP TR 21.905: "Vocabulary for 3GPP Specifications". V17.0.0 (July 2020)

[NPL 2] 3GPP TS 23.501: "System architecture for the 5G System (5GS)". V17.1.1 (June 2021)

[NPL 3] 3GPP TS 23.502: "Procedures for the 5G System (5GS)". V17.1.0 (June 2021)

[NPL 4] 3GPP TS 23.401: "General Packet Radio Service (GPRS) enhancements for Evolved Universal Terrestrial Radio Access Network (E-UTRAN) access". V17.1.0 (June 2021)

[NPL 5] 3GPP TS 23.700-40: "Study on enhancement of network slicing". V17.0.0 (March 2021)

[NPL 6] Generic Network Slice Template https://www.gsma.com/newsroom/wp-content/uploads/NG.116-v2.0.pdf

[NPL 7] 3GPP TS 23.503: "Policy and Charging Control Framework for the 5G System". V17.1.0 (June 2021)

SUMMARY OF INVENTION

Technical Problem

For a UE supporting N1 mode and S1 mode, a PDN Connection established in the EPS can also interwork in 5GS or a PDU session established in 5GS can interwork in EPS during the inter-system mobility procedure. Various aspects of the NSAC procedure are not defined when the PDN connection procedure is established on the EPS which supports interworking with 5GS. This disclosure identifies such scenarios and provides solutions to the identified scenarios.

Solution to Problem

In an aspect of the present disclosure, a core network node includes means for requesting a network node for a network slice management to update the number of user equipment (UE) registered to the network slice, means for requesting the network node for network slice management to update the number of Protocol Data Unit (PDU) sessions for a specific network slice and means for receiving, information indicating failure related to the number of the PDU sessions update.

In an aspect of the present disclosure, a network node for a network slice management includes means for receiving a request, from a core network node, to update of the number of user equipment (UE) registered to the network slice, means for receiving a request, from a core network node, to update the number of Protocol Data Unit (PDU) for a specific network slice; and means for sending, to a core network node, information indicating failure related to the number of PDU update.

In an aspect of the present disclosure, a method for a core network node includes requesting the network node for a network slice management, to update the number of a user equipment (UE) registered to the network slice, requesting the network node for network slice management, to update the number of a Protocol Data Unit (PDU) for a specific network slice, and receiving, from the network node for network slice management, information indicating failure related to the number of PDU update.

In an aspect of the present disclosure, a method for a network node for a network slice management includes receiving a request, from a core network node, to update of the number of user equipment (UE) registered to the network slice, receiving a request, from a core network node, to update the number of Protocol Data Unit (PDU) for a specific network slice, and sending, to a core network node, information indicating failure related to the number of PDU update.

DESCRIPTION OF EMBODIMENTS

<Description of Disclosure with Aspects>

Figure 1:
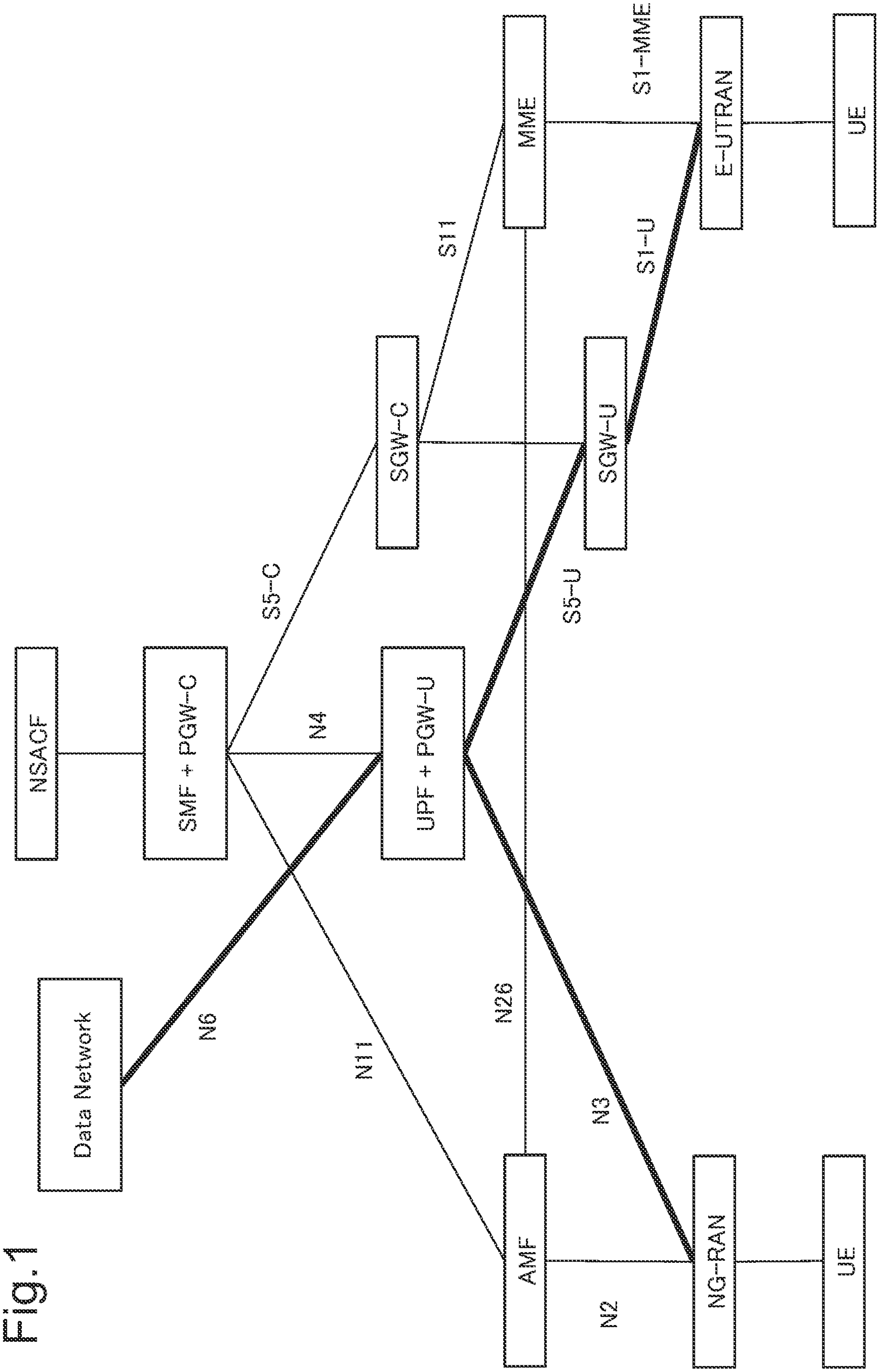
FIG. 1 illustrates Network Slice Admission Control in EPS and 5GS.

The disclosure relates to a method of a core network apparatus, a method of a User Equipment (UE), a method of a first core network apparatus, a core network apparatus, a User Equipment (UE) and a first core network apparatus.

<Abbreviations>

For the purposes of the present document, the abbreviations given in NPL 1 and the following apply. An abbreviation defined in the present document takes precedence over the definition of the same abbreviation, if any, in NPL 1.

4G-GUTI 4G Globally Unique Temporary UE Identity
5GC 5G Core Network
5GLAN 5G Local Area Network
5GS 5G System
5G-AN 5G Access Network
5G-AN PDB 5G Access Network Packet Delay Budget
5G-EIR 5G-Equipment Identity Register
5G-GUTI 5G Globally Unique Temporary Identifier
5G-BRG 5G Broadband Residential Gateway
5G-CRG 5G Cable Residential Gateway
5G GM 5G Grand Master
5G-RG 5G Residential Gateway
5G-S-TMSI 5G S-Temporary Mobile Subscription Identifier
5G VN 5G Virtual Network
5QI 5G QOS Identifier
AF Application Function
AMF Access and Mobility Management Function
AS Access Stratum
ATSSS Access Traffic Steering, Switching, Splitting
ATSSS-LL ATSSS Low-Layer
AUSF Authentication Server Function
AUTN Authentication token
BMCA Best Master Clock Algorithm
BSF Binding Support Function
CAG Closed Access Group
CAPIF Common API Framework for 3GPP northbound APIs
CHF Charging Function
CN PDB Core Network Packet Delay Budget
CP Control Plane
DAPS Dual Active Protocol Stacks
DCN Dedicated Core Network
DL Downlink
DN Data Network
DNAI DN Access Identifier
DNN Data Network Name
DRX Discontinuous Reception
DS-TT Device-side TSN translator
ePDG evolved Packet Data Gateway
EBI EPS Bearer Identity
EPS Evolved Packet System
EUI Extended Unique Identifier
FAR Forwarding Action Rule
FN-BRG Fixed Network Broadband RG
FN-CRG Fixed Network Cable RG
FN-RG Fixed Network RG
FQDN Fully Qualified Domain Name
GFBR Guaranteed Flow Bit Rate
GMLC Gateway Mobile Location Centre
GPRS General Packet Radio Service
GPSI Generic Public Subscription Identifier
GUAMI Globally Unique AMF Identifier
GUTI Globally Unique Temporary UE Identity
HR Home Routed (roaming)
HSS Home Subscriber Server
IAB Integrated access and backhaul
IMEI/TAC IMEI Type Allocation Code
IPUPS Inter PLMN UP Security
I-SMF Intermediate SMF
I-UPF Intermediate UPF
LADN Local Area Data Network
LBO Local Break Out (roaming)
LMF Location Management Function
LoA Level of Automation
LPP LTE Positioning Protocol
LRF Location Retrieval Function
MCC Mobile country code
MCX Mission Critical Service
MDBV Maximum Data Burst Volume
MFBR Maximum Flow Bit Rate
MICO Mobile Initiated Connection Only
MITM Man In The Middle
MNC Mobile Network Code
MPS Multimedia Priority Service
MPTCP Multi-Path TCP Protocol
N3IWF Non-3GPP Inter Working Function
N5CW Non-5G-Capable over WLAN
NAI Network Access Identifier
NEF Network Exposure Function
NF Network Function
NGAP Next Generation Application Protocol
NID Network identifier
NPN Non-Public Network
NR New Radio
NRF Network Repository Function
NSI ID Network Slice Instance Identifier
NSSAA Network Slice-Specific Authentication and Authorization NSSAAF Network Slice-Specific Authentication and Authorization Function
NSSAI Network Slice Selection Assistance Information
NSSF Network Slice Selection Function
NSSP Network Slice Selection Policy
NSSRG Network Slice Simultaneous Registration Group
NW-TT Network-side TSN translator
NWDAF Network Data Analytics Function
PCF Policy Control Function
PCO Protocol Configuration Options
PDB Packet Delay Budget
PDR Packet Detection Rule
PDU Protocol Data Unit
PEI Permanent Equipment Identifier PER Packet Error Rate
PFD Packet Flow Description
PLMN Public Land Mobile Network
PNI-NPN Public Network Integrated Non-Public Network
PPD Paging Policy Differentiation
PPF Paging Proceed Flag
PPI Paging Policy Indicator
PSA PDU Session Anchor
PTP Precision Time Protocol
QFI QOS Flow Identifier
QoE Quality of Experience
RACS Radio Capabilities Signalling optimisation
(R)AN (Radio) Access Network
RG Residential Gateway
RIM Remote Interference Management
RQA Reflective QoS Attribute
RQI Reflective QoS Indication
RSN Redundancy Sequence Number
SA NR Standalone New Radio
SBA Service Based Architecture
SBI Service Based Interface
SCP Service Communication Proxy
SD Slice Differentiator
SEAF Security Anchor Functionality
SEPP Security Edge Protection Proxy
SGSN Serving GPRS Support Node
SMF Session Management Function
SMSF Short Message Service Function
SN Sequence Number
SN name Serving Network Name.
SNPN Stand-alone Non-Public Network
S-NSSAI Single Network Slice Selection Assistance Information
SSC Session and Service Continuity
SSCMSP Session and Service Continuity Mode Selection Policy
SST Slice/Service Type
SUCI Subscription Concealed Identifier
SUPI Subscription Permanent Identifier
SV Software Version
TMSI Temporary Mobile Subscriber Identity
TNAN Trusted Non-3GPP Access Network
TNAP Trusted Non-3GPP Access Point
TNGF Trusted Non-3GPP Gateway Function
TNL Transport Network Layer
TNLA Transport Network Layer Association
TSC Time Sensitive Communication
TSCAI TSC Assistance Information
TSN Time Sensitive Networking
TSN GM TSN Grand Master
TSP Traffic Steering Policy
TT TSN Translator
TWIF Trusted WLAN Interworking Function
UCMF UE radio Capability Management Function
UDM Unified Data Management
UDR Unified Data Repository
UDSF Unstructured Data Storage Function
UL Uplink
UL CL Uplink Classifier
UPF User Plane Function
URLLC Ultra Reliable Low Latency Communication
URRP-AMF UE Reachability Request Parameter for AMF
URSP UE Route Selection Policy
VID VLAN Identifier
VLAN Virtual Local Area Network
VPLMN Visited PLMN
W-5GAN Wireline 5G Access Network
W-5GBAN Wireline BBF Access Network
W-5GCAN Wireline 5G Cable Access Network
W-AGF Wireline Access Gateway Function

Definitions

For the purposes of the present document, the terms and definitions given in NPL 1 and the following apply. A term defined in the present document takes precedence over the definition of the same term, if any, in NPL 1.

General

Those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the Aspects of the present disclosure so as not to obscure the figures with details that will be readily apparent to those skilled in the art having the benefit of the description herein.

For the purpose of promoting an understanding of the principles of the disclosure, reference will now be made to the Aspect illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or entities or subsystems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an Aspect", "in another Aspect" and similar language throughout this specification may, but not necessarily do, all refer to the same Aspect.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

As used herein, information is associated with data and knowledge, as data is meaningful information and represents the values attributed to parameters. Further knowledge signifies understanding of an abstract or concrete concept. Note that this example system is simplified to facilitate description of the disclosed subject matter and is not intended to limit the scope of this disclosure. Other devices, systems, and configurations may be used to implement the Aspects disclosed herein in addition to, or instead of, a system, and all such Aspects are contemplated as within the scope of the present disclosure.

The FIG. 1 illustrates the architecture with respect to the Network Slice Admission Control in EPS and 5GS. The NSACF controls the network Slice Admission Control per network slice basis. When the UE is in the EPS, the SMF+PGW-C is responsible to interwork with the NSACF for updating the number of UEs allowed to use the network slice and the number of PDN connections allowed to be established that associates with the network slice. The SMF+PGW-C may be called as SMF/PGW-C.

In one example, the UDM in a supporting HPLMN may optionally keep a record of the PEIs or Type Allocation Codes values regarding UE ability to support NSAC feature. The UDM may, based on configuration or the optional PEI records, indicate the AMF that the UE supports NSAC feature. The UDM indicates whether the UE supports NSAC feature based on the PEI to an AMF in both HPLMN and VPLMN case.

Each of Aspects and elements included in the each Aspects described below may be implemented independently or in combination with any other. These Aspects include novel characteristics different from one another. Accordingly, these Aspects contribute to achieving objects or solving problems different from one another and contribute to obtaining advantages different from one another.

<Aspect 1: UE Maintains the Back-Off Timer when PDN Connection Establishment Fails Due to Network Slice Admission Control in EPS>

One of the outstanding problems is how to control the number of UEs registered with a network slice and the number of the PDU Sessions/PDN connections established on a network slice in the case of EPS and 5GS interworking and mobility.

In case that the PDN connection establishment fails due to Network slice admission control in EPS, it is unclear on network behavior and the UE behavior in NPL 4. For example, it is unclear what the SMF+PGW-C is supposed to do if the NSACF accepts the admission control for the UE but not for the PDU session.

The Aspect 1 discloses a message flow in a case where the PDN connection establishment fails due to Network slice admission control in EPS.

There are two cases where the PDN connection establishment fails in the EPS. One case is that the number of UEs allowed to use the network slice reaches or exceeds the pre-defined limitation of the quota for the maximum number of UEs registered with the network slice. Another case is that the number of PDN connections allowed to be established that associates with the network slice reaches or exceeds the pre-defined limitation of the maximum number of PDN connections quota for the network slice. The pre-defined limitation of the quota for the network slice may be called as the maximum number of UEs allowed to use a network slice or threshold value for the number of UEs allowed to use a network slice. The pre-defined limitation of the maximum number of PDN connections quota for the network slice may be called as the maximum number of PDN connections allowed to be established on the network slice or threshold value for the number of PDN connections allowed to be established on the network slice.

This Aspect discloses the SMF+PGW-C interacting with the NSACF in a case where either one procedure out of the UE registration to the NSACF for a network slice and the PDU Session registration (or PDN connection registration) to the NSACF for a network slice fails.

Figure 2:
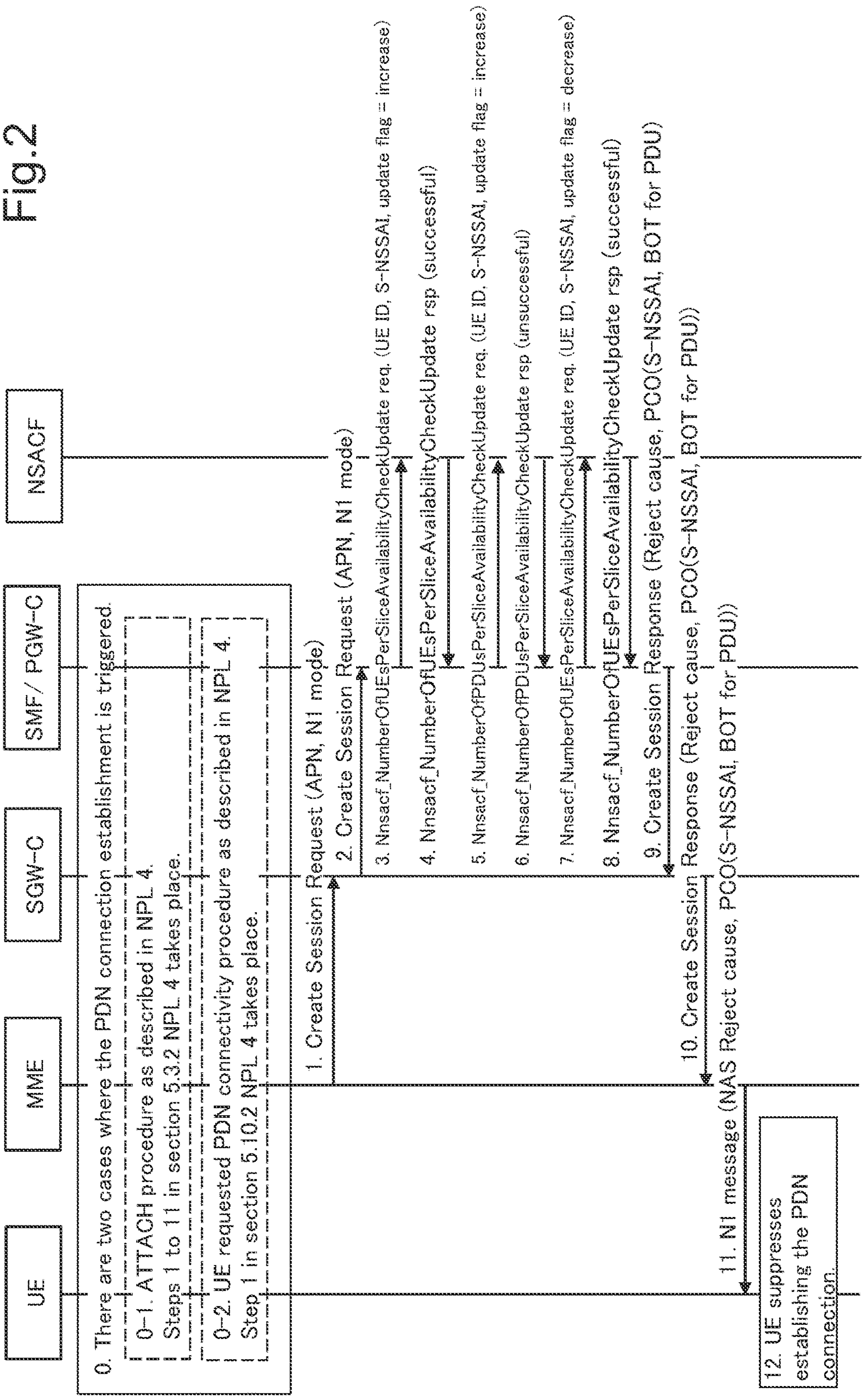
FIG. 2 illustrates Network Slice Admission Control in EPS (Unsuccessful case).

The FIG. 2 illustrates the failure of the PDN connection establishment procedure due to Network Slice Admission Control in EPS.

0. The UE initiates either the ATTACH procedure (step 0-1) or the UE requested PDN connectivity procedure (step 0-2). During the procedure, the NAS message sent by the UE during the procedure may include the UE capability information. The UE capability information may be "N1 mode supported" in the UE network capability parameter. The UE capability information may be "N1 mode not supported" in the UE network capability parameter. If "N1 mode supported" is indicated, the UE can interwork with the 5GS. For example, "N1 mode supported" indicates that the UE can interwork with the 5GS.

The UE may include another capability information in the UE network capability parameter to indicate whether the UE is capable to handle the Network Slice Admission Control related procedure, i.e. whether the UE supports the NSAC functionality (e.g. NSAC procedure). For example, the capability information indicates whether the UE can receive and handle the Network Slice Admission Control related parameters from the EPC. The UE sends this capability information to the MME in a NAS message during ATTACH procedure or in an EPS session management message (e.g. PDN Connectivity Request) during the PDN connectivity establishment procedure. In one example, the UE includes this capability information in the PCO parameter on the NAS message intending to send it to the PGW-C. The MME forwards this capability information to the S-GW (e.g. SGW-C) in a Create Session Request message, and the S-GW (e.g. the SGW-C) further sends this capability information to the P-GW (e.g. SMF/PGW-C) in a Create Session Request message. The P-GW (e.g. the SMF/PGW-C) stores this capability information. The P-GW (e.g. the SMF/PGW-C) performs at least one of number of UEs per network slice availability check and update and number of PDUs per network slice availability check and update if the UE capability information indicates that the UE supports NSAC procedure (or if the UE indicates the another capability information). If the UE capability information is not present or it is present and indicates UE does not support NSAC procedure, then the P-GW (e.g. the SMF/PGW-C) shall not initiate number of UEs per network slice availability check and update and number of PDUs per network slice availability check and update.

In one example, the SMF/PGW-C may perform NSAC procedure for the UE (i.e. check availability for the number of UEs registered for a network slice and the number of PDU sessions established on the network slice with NSACF) which does not support NSAC feature.

1. The MME selects the SGW-C and PGW-C. Then, the MME sends, to the SGW-C, the Create Session Request message including the APN and N1 mode parameter. The N1 mode parameter is included if the MME receives "N1 mode supported" in the UE network capability parameter in step 0. The N1 mode parameter may indicate that the UE is capable to handle the Network Slice Admission Control related procedure or the UE can receive and handle the Network Slice Admission Control related parameters or procedures for the EPS. For example, during the ATTACH procedure or the UE requested PDN connectivity procedure, the MME selects the SGW-C and the PGW-C, and sends the Create Session Request message to the SGW-C. The Create Session Request message may be sent during the ATTACH procedure or the UE requested PDN connectivity procedure. For example, the APN may be related to the ATTACH procedure or the UE requested PDN connectivity procedure. The APN may be called as information indicating the APN or information related to the APN.

2. The SGW-C sends, to the SMF/PGW-C, the Create Session Request message including the APN and the N1 mode parameter. For example, the SGW-C sends the Create Session Request message to the SMF/PGW-C in a case where the SGW-C receives the Create Session Request message from the MME.

3. The SMF/PGW-C finds an associated S-NSSAI to the received APN based on the received APN and local configuration. The SMF/PGW-C may be called as SMF+PGW-C in this disclosure. For example, the SMF/PGW-C finds an associated S-NSSAI to the received APN in a case where the SMF/PGW-C receives the Create Session Request message from the SGW-C. Then the SMF/PGW-C sends Nnsacf_NumberOfUEsPerSliceAvailabilityCheckUpdate request to the NSACF with the update flag set to "increase". This update flag set to "increase" may be called as information indicating to increase the number of UEs for NSAC or a request to increase the number of UEs for NSAC.

For example, the SMF/PGW-C sends the Nnsacf_NumberOfUEsPerSliceAvailabilityCheckUpdate request to check if the attachment or registration of the UE is allowed.

For example, in a case where N1 mode is indicated in the Create Session Request message in step 2 (e.g. in a case where the SMF/PGW-C determines that the N1 mode parameter is included in the received Create Session Request message in step 2), the SMF/PGW-C sends the Nnsacf_NumberOfUEsPerSliceAvailabilityCheckUpdate request to the NSACF. The Nnsacf_NumberOfUEsPerSliceAvailabilityCheckUpdate request may include UE ID (identity or identifier for the UE) and the S-NSSAI associated to the received APN. For example, the SMF/PGW-C stores mapping information of S-NSSAIs and APNs, hence the SMF/PGW-C can determine the associated S-NSSAI to the received APN based on the received APN from the SGW-C.

The Nnsacf_NumberOfUEsPerSliceAvailabilityCheckUpdate request may be called as an Nnsacf_NumberOfUEsPerSliceAvailabilityCheckUpdate request message in this disclosure.

4. Upon reception of Nnsacf_NumberOfUEsPerSliceAvailabilityCheckUpdate request message, if the update flag parameter from the SMF/PGW-C indicates "increase", the following processes apply:

If the received UE ID is not in the list of UE IDs registered with the network slice related to the received S-NSSAI and the maximum number of UEs registered with the network slice has not been reached yet, the NSACF adds the received UE ID in the list of UEs registered with the network slice, and increases the current number of the UEs registered with the network slice. For example, the list of UEs registered with the network slice is stored and managed by the NSACF.

The NSACF sends Nnsacf_NumberOfUEsPerSliceAvailabilityCheckAndUpdate response which indicates that the UE is registered successfully for the S-NSSAI. For example, the Nnsacf_NumberOfUEsPerSliceAvailabilityCheckAndUpdate response includes information indicating that registration of the UE is allowed.

If the maximum number of UEs registered with the network slice has been reached however, the UE ID is found in the list of UEs registered with the network slice, the NSACF does not add the UE ID in the list of UEs registered with the network slice and does not increases the current number of the UEs registered with the network slice. The NSACF sends Nnsacf_NumberOfUEsPerSliceAvailability Check AndUpdate response which indicates that the UE is registered successfully for the S-NSSAI.

The Nnsacf_NumberOfUEsPerSliceAvailabilityCheckUpdate response may be called as an Nnsacf_NumberOfUEsPerSliceAvailabilityCheckUpdate response message in this disclosure.

5. The SMF/PGW-C sends Nnsacf_NumberOfPDUsPerSliceAvailabilityCheckUpdate request to the NSACF with update flag set to "increase". This update flag set to "increase" may be called as information indicating to increase the number of PDU sessions for NSAC or a request to increase the number of PDU sessions for NSAC.

The Nnsacf_NumberOfPDUsPerSliceAvailabilityCheckUpdate request may include the UE ID and the S-NSSAI associated to the received APN.

The Nnsacf_NumberOfPDUsPerSliceAvailabilityCheckUpdate request may be called as an Nnsacf_NumberOfPDUsPerSliceAvailabilityCheckUpdate request message in this disclosure.

For example, in a case where the SMF/PGW-C sends the Nnsacf_NumberOfUEsPerSliceAvailabilityCheckUpdate request to the NSACF, the SMF/PGW-C may send the Nnsacf_NumberOfPDUsPerSliceAvailabilityCheckUpdate request to the NSACF.

For example, in a case where the SMF/PGW-C receives the Nnsacf_NumberOfUEsPerSliceAvailabilityCheckUpdate response from the NSACF, the SMF/PGW-C may send the Nnsacf_NumberOfPDUsPerSliceAvailabilityCheckUpdate request to the NSACF.

6. Upon reception of Nnsacf_NumberOfPDUsPerSliceAvailabilityCheckUpdate request message, if the update flag parameter from the SMF/PGW-C indicates "increase", the following processes apply:

If the maximum number of PDU Sessions established on the network slice related to the received S-NSSAI has already been reached, then the NSACF returns a result parameter indicating that the maximum number of PDU Sessions per network slice has been reached.

The NSACF sends the Nnsacf_NumberOfPDUsPerSliceAvailabilityCheckUpdate response to the SMF/PGW-C with the result parameter. For example, the Nnsacf_NumberOfPDUsPerSliceAvailabilityCheckUpdate response indicates that the UE is not allowed to use the S-NSSAI due to limitation of the quota, or the maximum number of PDN connections has been reached or the number of the PDN connections has exceeded the limitation of PDN connection quota of the APN. For example, the Nnsacf_NumberOfUEsPerSliceAvailabilityCheckUpdate response includes information indicating that the UE is not allowed to use the S-NSSAI.

7. Upon reception of the Nnsacf_NumberOfPDUsPerSliceAvailabilityCheckUpdate response, the SMF/PGW-C sends, to the NSACF, the Nnsacf_NumberOfUEsPerSliceAvailabilityCheckAndUpdate request message containing update flag set to "decrease". This message is sent to the network to decrease the number of UE count for the S-NSSAI. I.e., this message is sent to the network to decrease the number of UEs for the S-NSSAI. This update flag set to "decrease" may be called as information indicating to decrease the number of UEs for the NSAC. The Nnsacf_NumberOfUEsPerSliceAvailabilityCheckUpdate request may include the UE ID and the S-NSSAI associated to the received APN.

8. Upon reception of the Nnsacf_NumberOfUEsPerSliceAvailabilityCheckAndUpdate request, if the update flag parameter from the SMF/PGW-C indicates "decrease", the following processes apply:

If there is only one entry associated with the received UE ID, the NSACF removes the UE ID from the list of UEs registered with the network slice for each of the S-NSSAI(s) indicated in the request from the SMF/PGW-C.

The NSACF decreases the number of UEs per network slice that is maintained by the NSACF for each of these network slices.

The NSACF sends Nnsacf_NumberOfUEsPerSliceAvailabilityCheckAndUpdate response message to the SMF/PGW-C. For example, the NSACF sends the Nnsacf_NumberOfUEsPerSliceAvailabilityCheckAndUpdate response which indicates that the decrement of the number of registered UEs for the S-NSSAI is successfully completed. For example, the Nnsacf_NumberOfUEsPerSliceAvailability CheckAndUpdate response includes information indicating that the decrement of the number of registered UEs for the S-NSSAI is successfully completed. The information indicating that the decrement of the number of registered UEs for the S-NSSAI is successfully completed may be called as information indicating that the decrement of the number of UEs for the NSAC is successfully completed.

9. The SMF/PGW-C sends, to the SGW-C, the Create Session Response message including new reject cause and PCO parameter. The new reject cause may have a value "Unsuccessful PDN connection establishment due to Quota control", "Unsuccessful PDN connection establishment due to UE Quota control", "Unsuccessful PDN connection establishment due to PDN connection Quota control" or other notation of a reject cause with the purpose to reject the PDN connection establishment due to the number of the PDN connections associated with the network slice has reached or exceeded the maximum quota. The PCO parameter includes the Back off timer (BOT) for PDU session and the S-NSSAI that is associated with the APN. As mentioned above, the S-NSSAI is related to or associated to the received APN in step 2, hence the BOT for PDU session may be related to the APN. The BOT in this disclosure may means that a value or a period of the BOT. The PCO parameter may be called as PCO. The BOT for PDU session may be called as BOT for PDU.

10. The SGW-C sends, to the MME, the Create Session Response message including the new reject cause and the PCO parameter as included by the SMF/PGW-C in step 9.

For example, the SGW-C sends the Create Session Response message in a case where the SGW-C receives the Create Session Response message of the step 9 from the SMF/PGW-C.

11. The MME sends, to the UE, the NAS message including a new NAS reject cause and the PCO parameter. The MME creates the new NAS reject cause based on the reject cause value that is received in step 10 from the SGW-C.

The NAS reject cause may have a same or corresponding value to the reject cause value that is received in step 10 from the SGW-C. The NAS message may be called as a N1 message.

The new NAS reject cause may have a value "Unsuccessful PDN connection establishment due to Quota control", "Unsuccessful PDN connection establishment due to UE Quota control", "Unsuccessful PDN connection establishment due to PDN connection Quota control" or other notation of reject cause with the purpose to reject the PDN connection establishment due to the number of the PDN connections associated with the network slice has reached or exceeded the maximum quota.

If the MME recognizes the UE as neither capable to interwork with 5GS nor capable to handle Network Slice Admission Control based on information received in step 0 or based on the IMEISV value of the UE, the MME may send, to the UE, another NAS message indicating unsuccessful PDU connection establishment by using the existing message, existing cause value and existing parameters. In one example, the MME sends at least one of existing parameters, Back-off timer value IE, T3442 value, T3346 value and T3448 value.

12. Based on the parameters in the NAS message in step 11, the following processes may apply to the UE:

The UE associates the APN that is indicated in step 0 and the S-NSSAI that is included in the PCO parameter received in the step 11.

The UE suppresses for establishing the PDN connection to the same APN as the UE indicated in step 0 until the BOT for PDU expires.

The UE suppresses for establishing the PDN connection to the same APN as the UE indicated in step 0 until the T3442 value expires.

The UE suppresses for establishing the PDN connection to the same APN as the UE indicated in step 0 until the T3346 value expires.

The UE suppresses for establishing the PDN connection to the same APN as the UE indicated in step 0 until the T3448 value expires.

<Variant 1 of the Aspect 1>

In step 6, when the SMF/PGW-C receives the Nnsacf_NumberOfPDUsPerSliceAvailabilityCheckUpdate response, the SMF/PGW-C decides to keep the UE registered in the NSCAF for the number of the UEs for the S-NSSAI. I.e., SMF/PGW-C does not send Nnsacf_NumberOfUEsPerSliceAvailabilityCheckAndUpdate request with the update flag set to "decrease". When the SMF/PGW-C receives a Create session Request message for the APN which is associated with the S-NSSAI, the SMF/PGW-C only sends Nnsacf_NumberOfPDUsPerSliceAvailabilityCheckUpdate request message to increment the number of PDU session for the S-NSSAI.

<Variant 2 of the Aspect 1>

In steps 3 to 8, instead of the SMF/PGW-C sends three request messages in steps 3, 5 and 7, the SMF/PGW-C sends only one combined message. For example, the SMF/PGW-C sends, to the NSACF, Nnsacf_NumberOfUEsandPDUsPerSliceAvailabilityCheckUpdate request message requesting to register both the UE and the PDU session. Upon reception of the Nnsacf_NumberOfUEsandPDUsPerSliceAvailabilityCheckUpdate request message, the NSACF may take following actions:

Providing successful result parameter to the SMF/PGW-C if the maximum number of UEs on the network slice has not been reached and the maximum number of PDU Sessions established on the network slice has not been reached;

Providing successful result parameter to the SMF/PGW-C if the maximum number of the UEs on the network slice has been reached and the maximum number of PDU Sessions established on the network slice has not been reached however, the UE ID has been found in the list of UEs already registered for that network slice. In this case, the NSACF does not increase the UE counter however the NSACF increases the PDU Session counter. I.e., the NSACF does not increase the number of UEs, however the NSACF increases the number of PDU Sessions.

Providing unsuccessful result parameter if either or both the maximum number of UEs on the network slice has been reached and the maximum number of PDU Sessions established on the network slice has been reached (or if at least one of the maximum number of UEs on the network slice and the maximum number of PDU Sessions established on the network slice has been reached). In this case, the NSACF does not increase the UE counter and PDU Session counter. I.e., the NSACF does not increase the number of UEs and the number of PDU Sessions.

<Variant 3 of the Aspect 1>

If the SMF/PGW-C finds more than one S-NSSAIs associated with the APN, then the SMF/PGW-C sends, to the NSACF, Nnsacf_NumberOfUEsPerSliceAvailabilityCheckUpdate request with update flag set to "increase" for the first network slice associated with the APN as per step 3 of FIG. 2. If the NSACF returned successful result in step 4, the SMF/PGW-C continues with the PDN connection registration with the NSACF for the same associated network slice as per step 5 of FIG. 2.

If the NSACF returned unsuccessful result in step 4, the SMF/PGW-C sends, to the NSACF, another Nnsacf_NumberOfUEsPerSliceAvailabilityCheckUpdate request with update flag set to "increase" for the next associated network slice (e.g. second network slice associated with the APN).

If the NSACF returned successful result for the another Nnsacf_NumberOfUEsPerSliceAvailabilityCheckUpdate request, the SMF/PGW-C continues with the PDN connection registration with the NSACF for the second network slice and sends, to the NSACF, Nnsacf_NumberOfPDUsPerSliceAvailabilityCheckUpdate request with update flag set to "increase" for the second network slice as per step 5 of FIG. 2.

If the NSACF returned unsuccessful result for the Nnsacf_NumberOfPDUsPerSliceAvailabilityCheckUpdate request, the SMF/PGW-C sends, to the NSACF, another Nnsacf_NumberOfUEsPerSliceAvailabilityCheckUpdate request with update flag set to "increase" for the next associated network slice (e.g. third network slice associated with the APN). When multiple network slices are associated with the APN, the SMF/PGW-C may try UE registration with the NSACF and or the PDN connections registration with the NSACF with each one in turn if previous attempts are unsuccessful.

In one example, if multiple S-NSSAIs are associated with the APN, then the SMF+PGW-C first selects S-NSSAI for which EPS counting is not required in the EPS to establish the PDN connection. If the PDN connection procedure fails all S-NSSAIs for which the EPS counting is not required, then the SMF+PGW-C selects the S-NSSAI for the PDN connection for which EPS counting is required.

<Variant 4 of the Aspect 1>

In one example, in step 2 if more than one S-NSSAIs are mapped to the APN and one of the S-NSSAIs is not subject to the NSAC procedure, the SMF/PGW-C first selects the S-NSSAI which is not subject to the NSAC and associates the S-NSSAI to the PDN connection. If the PDN connection fails (for example, if the SMF/PGW-C receives the Nnsacf_NumberOfPDUsPerSliceAvailabilityCheckUpdate response indicating that the UE is not allowed to use the S-NSSAI due to limitation of the quota) then the network shall select another S-NSSAI which is subject to the NSAC for the PDN connection establishment.

For example, the Aspect 1 and the variants of the Aspect 1 can provide solutions for various situations that the NSAC procedure is not defined when the PDN connection procedure is established on the EPS which supports interworking with 5GS.

For example, the Aspect 1 and the variants of the Aspect 1 can solve the outstanding problems how to control the number of UEs registered with a network slice and the number of the PDU Sessions/PDN connections established on a network slice in the case of EPS and 5GS interworking and mobility.

For example, the Aspect 1 and the variants of the Aspect 1 can solve the problem, in case that the PDN connection establishment fails due to Network slice admission control in EPS, that it is unclear on network behavior and the UE behavior in NPL 4.

For example, the Aspect 1 and the variants of the Aspect 1 can solve the problem what the SMF+PGW-C is supposed to do if the NSACF accepts the admission control for the UE but not for the PDU session.

<Aspect 2: Handling of Network Slice Admission Control when N1 Mode Capability is Disabled after Successful PDN Connection Establishment in EPS.>

When the UE supporting N1 mode and S1 mode establishes a PDN connection for an APN in the EPS, the SMF/PGW-C entity (or the SMF/PGW-C) maps the APN to a network slice based on local configuration. The SMF/PGW-C entity performs NSAC procedure for the network slice to perform the number of UEs per network slice availability check and update and to perform the number of PDU sessions per network slice availability check and update. However, the network behavior and the UE behavior are not defined with respect to the NSAC procedure when the UE disables N1 mode capability.

The Aspect 2 discloses a behavior of the UE and a behavior of the network in a case where the UE disables N1 mode capability after successful PDN connection establishment with SMF+PGW-C in EPS.

Figure 3:
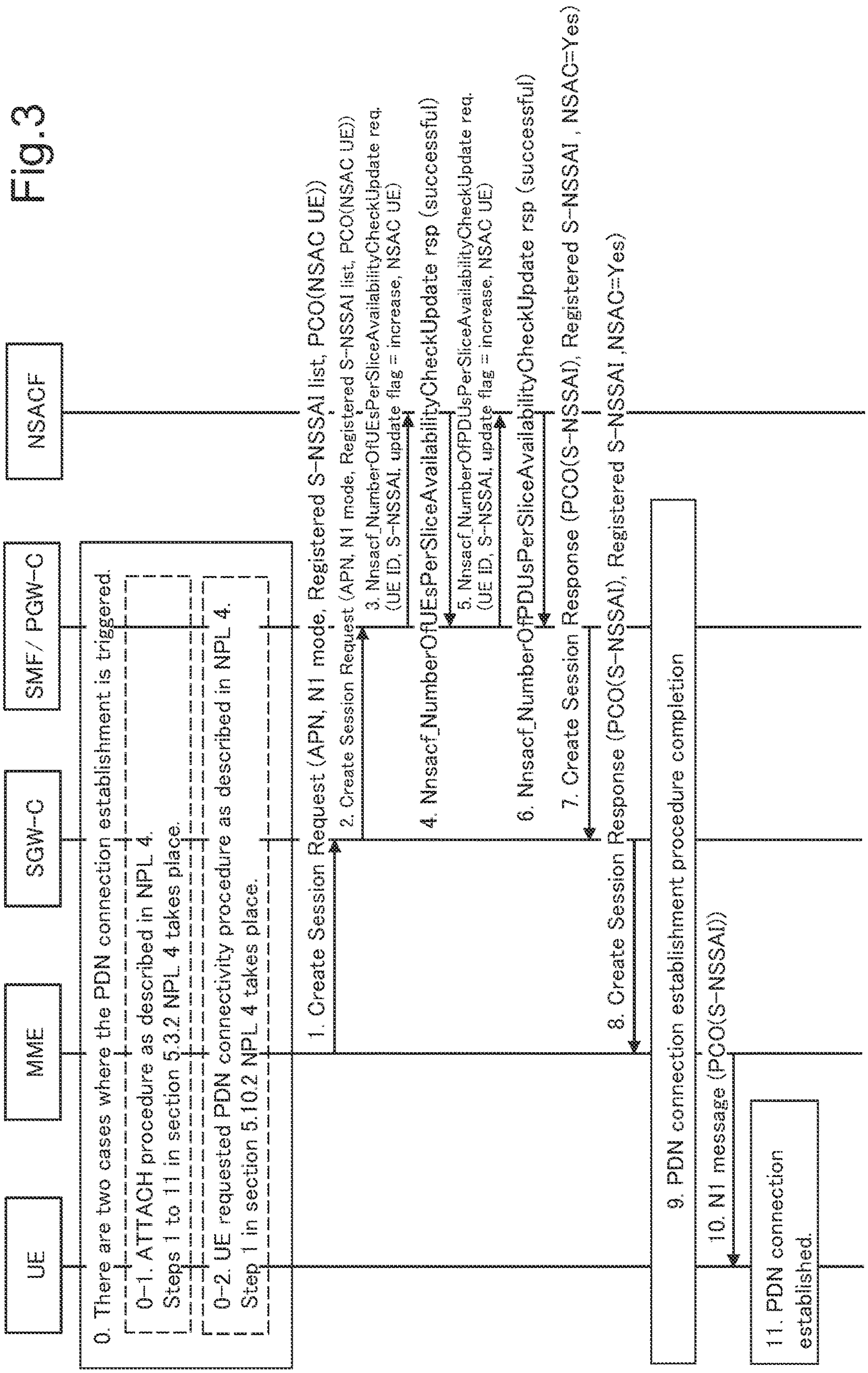
FIG. 3 illustrates Network Slice Admission Control in EPS (Successful case).
Figure 4:
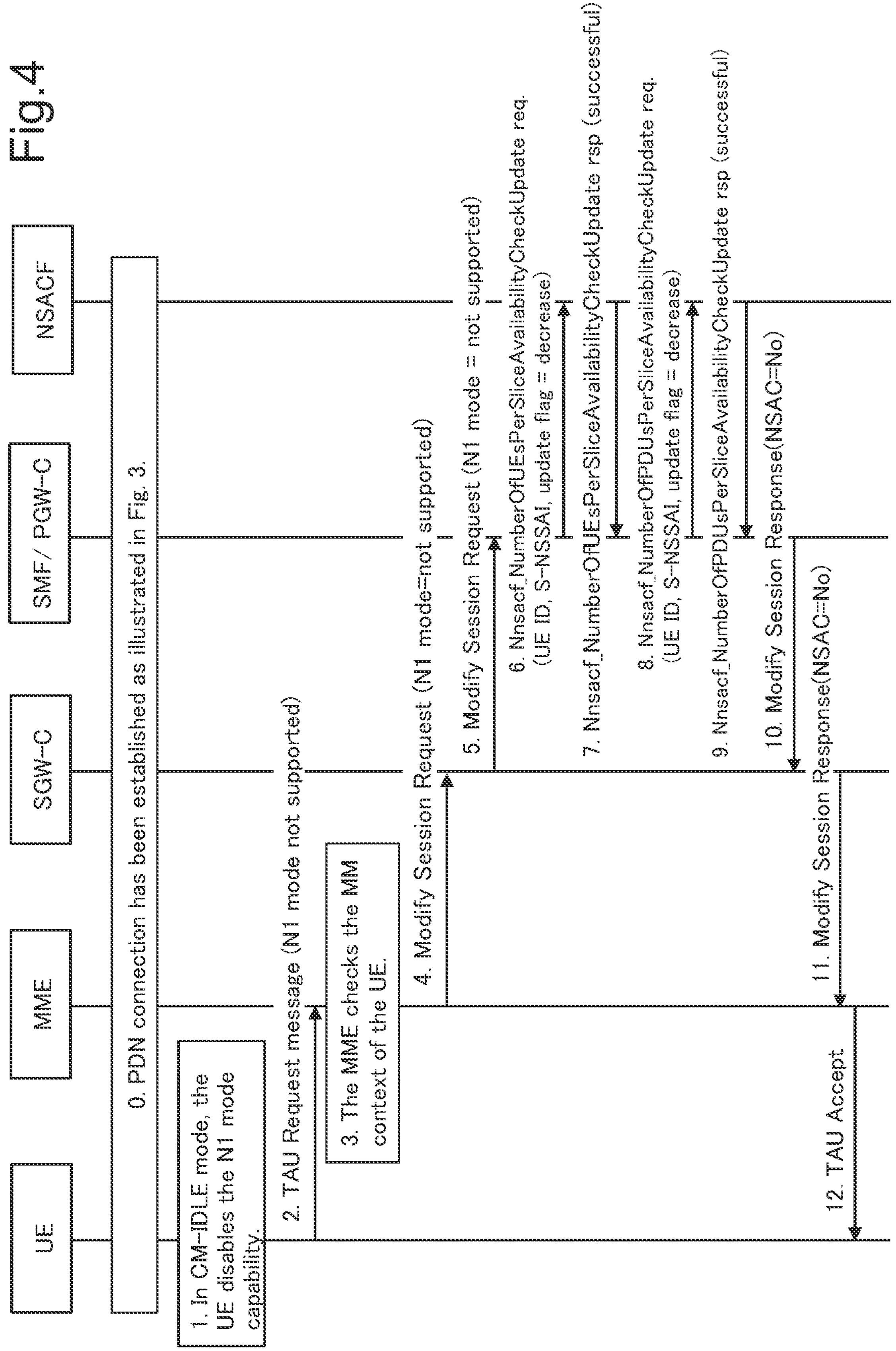
FIG. 4 illustrates Handling of Network Slice Admission Control when N1 mode capability.

In this Aspect, two procedures are illustrated. FIG. 3 illustrates a procedure related to the successful PDN connection establishment in EPS. FIG. 4 illustrates a procedure related to the N1 mode capability disabling after successful PDN connection establishment.

0. The UE initiates either the ATTACH procedure (step 0-1) or the UE requested PDN connectivity procedure (step 0-2). During the procedure, the NAS message sent by the UE during the procedure may include the UE capability information. The UE capability information may be "N1 mode supported" in the UE network capability parameter. If "N1 mode supported" is indicated, the UE can interwork with the 5GS. The MME stores "N1 mode supported" in the MM context of the UE. For example, the MME receives, from the UE, the UE capability information during the ATTACH procedure or the UE requested PDN connectivity procedure.

In another UE capability information, the UE may also indicate whether the UE is capable to handle the Network Slice Admission Control related procedure, i.e. whether the UE supports the NSAC functionality (or NSAC procedure). For example, the another UE capability information indicates whether the UE can receive and handle the Network Slice Admission Control related parameters from the EPC. The UE sends, to the MME, this capability in a NAS message during ATTACH procedure or in an EPS session management message (e.g. PDN Connectivity Request) during the PDN connectivity establishment procedure. In one example, the UE includes this capability information in the PCO parameter on the NAS message intending to send it to the PGW-C. The MME sends this capability information to the S-GW (e.g. SGW-C) in a Create Session Request message, and then the S-GW (e.g. the SGW-C) further sends this capability information to the P-GW (e.g. SMF/PGW-C) in a Create Session Request message. The P-GW (e.g. the SMF/PGW-C) stores this UE capability for NSAC support information. The P-GW (e.g. the SMF/PGW-C) performs at least one of number of UEs per network slice availability check and update, and number of PDUs per network slice availability check and update if the capability information indicates that the UE supports NSAC procedure (e.g. if the capability information indicates that the UE is capable to handle the Network Slice Admission Control related procedure). If the capability information is not present or it is present and indicates that the UE does not support NSAC procedure, then the P-GW (e.g. the SMF/PGW-C) shall not initiate number of UEs per network slice availability check and update, and number of PDUs per network slice availability check and update.

1. The MME selects the SGW-C and PGW-C. Then, the MME sends, to the SGW-C, the Create Session Request message including the APN, N1 mode parameter, Registered S-NSSAI list and PCO parameter.

For example, during the ATTACH procedure or the UE requested PDN connectivity procedure, the MME selects the SGW-C and the PGW-C, and sends the Create Session Request message to the SGW-C. The Create Session Request message may be sent during the ATTACH procedure or the UE requested PDN connectivity procedure. For example, the APN may be related to the ATTACH procedure or the UE requested PDN connectivity procedure. The APN may be called as information indicating the APN or information related to the APN.

The N1 mode parameter is included if the MME receives "N1 mode supported" in the UE network capability parameter in step 0.

The PCO parameter includes the UE support of NSAC handling capability that is received in step 0 from the UE. For example, the UE support of NSAC handling capability may be called as NSAC UE or NSAC UE parameter. For example, NSAC UE indicates that the UE supports the NSAC functionality (or NSAC procedure).

If the MME holds or stores a registered S-NSSAI(s) for the UE registrations count in the NSACF from the previous PDN connection establishment procedure, the MME includes the registered S-NSSAI(s) in the Registered S-NSSAI list parameter. For example, the Registered S-NSSAI list parameter includes one or more pairs of S-NSSAIs with their associated APNs.

For example, the Registered S-NSSAI list parameter includes a list of a pair of S-NSSAI and APN corresponding to the S-NSSAI and the MME includes the Registered S-NSSAI list in the Create Session Request message.

For example, during the previous PDN connection establishment procedure (e.g. the previous ATTACH procedure related to APN or the previous UE requested PDN connectivity procedure related to the APN), the MME communicates with the SMF/PGW-C or the NSACF via the SGW-C, and receives, from the SMF/PGW-C or the NSACF via the SGW-C, S-NSSAI corresponding to the APN if the NSAC for the S-NSSAI is completed successfully (e.g. if the maximum number of UEs registered with the network slice related to the S-NSSAI has not been reached yet and the maximum number of PDU sessions established on the network slice related to the S-NSSAI has not been reached yet). In this case, the MME associates the APN with the received S-NSSAI, and stores a pair of the APN and the received S-NSSAI in the Registered S-NSSAI list parameter. For example, the Registered S-NSSAI list includes a pair of the S-NSSAI that the NSAC is completed and the APN corresponding to the S-NSSAI.

2. The SGW-C sends, to the SMF/PGW-C, the Create Session Request message including the APN, the Registered S-NSSAI list, the N1 mode parameter and the PCO parameter. For example, the SGW-C sends the Create Session Request message to the SMF/PGW-C in a case where the SGW-C receives the Create Session Request message from the MME.

3. The SMF/PGW-C finds an associated S-NSSAI to the received APN based on the received APN and local configuration. For example, the SMF/PGW-C finds an associated S-NSSAI to the received APN in a case where the SMF/PGW-C receives the Create Session Request message from the SGW-C. Then the SMF/PGW-C sends, to the NSACF, Nnsacf_NumberOfUEsPerSliceAvailabilityCheckUpdate request with the update flag set to "increase" and the NSAC UE parameter if the received Registered S-NSSAI list parameter includes the associated S-NSSAI with another APN pair. For example, the SMF/PGW-C may not send the Nnsacf_NumberOfUEsPerSliceAvailabilityCheckUpdate request with the update flag set to "increase" and the NSAC UE parameter if the received Registered S-NSSAI list parameter does not include the associated S-NSSAI with another APN pair.

For example, in a case where the received Registered S-NSSAI list parameter includes a pair of S-NSSAI 1 and APN 1 and the SMF/PGW-C finds that the S-NSSAI 1 is associated with received APN 2 based on the local configuration in step 3, then the SMF/PGW-C determines that the received Registered S-NSSAI list parameter includes a pair of the associated S-NSSAI (i.e. S-NSSAI 1) and another APN (i.e. APN 1), and sends, to the NSACF, the Nnsacf_NumberOfUEsPerSliceAvailabilityCheckUpdate request including the update flag which is set to "increase" and the NSAC UE parameter. For example, the SMF/PGW-C may determine whether a pair of S-NSSAI and the received APN in step 2 is included in the received Registered S-NSSAI list parameter. If the SMF/PGW-C determines that the pair of S-NSSAI and the received APN in step 2 is not included in the received Registered S-NSSAI list parameter, the SMF/PGW-C may send, to the NSACF, the Nnsacf_NumberOfUEsPerSliceAvailabilityCheckUpdate request.

For example, the SMF/PGW-C sends the Nnsacf_NumberOfUEsPerSliceAvailabilityCheckUpdate request to check if the attachment or registration of the UE is allowed.

The Nnsacf_NumberOfUEsPerSliceAvailabilityCheckUpdate request may include UE ID and the S-NSSAI associated to the received APN. For example, the SMF/PGW-C stores mapping information of S-NSSAIs and APNs, hence the SMF/PGW-C can determine the associated S-NSSAI to the received APN based on the received APN from the SGW-C.

4. Upon reception of the Nnsacf_NumberOfUEsPerSliceAvailabilityCheckUpdate request message, if the update flag parameter from the SMF/PGW-C indicates "increase", the following processes apply:

If the UE ID is not in the list of UE IDs registered with the network slice related to the received S-NSSAI and the maximum number of UEs registered with the network slice has not been reached yet, the NSACF adds the UE ID in the list of UEs registered with the network slice and increases the current number of the UEs registered with the network slice. For example, the list of UEs registered with the network slice is stored and managed by the NSACF. The NSACF sends Nnsacf_NumberOfUEsPerSliceAvailabilityCheck-AndUpdate response which indicates that the UE is registered successfully for the S-NSSAI. For example, the NSACF may send the Nnsacf_NumberOfUEs-PerSliceAvailabilityCheckAndUpdate response which indicates that the increment of the number of UEs registered with the network slice is completed successfully.

If the maximum number of UEs registered with the network slice has been reached however, the UE ID is found in the list of UEs registered with the network slice, the NSACF does not add the UE ID in the list of UEs registered with the network slice and does not increase the current number of the UEs registered with the network slice. The NSACF sends Nnsacf_NumberOfUEsPerSliceAvailabilityCheckAndUpdate response which indicates that the UE is registered successfully for the S-NSSAI.

If the NASC UE parameter is included in step 3, the NSACF keeps NSAC UE parameter together with the UE ID. The NSACF may use the NSAC UE parameter for statistic measurement purpose.

5. The SMF/PGW-C sends, to the NSACF, Nnsacf_NumberOfPDUsPerSliceAvailabilityCheckUpdate request with update flag set to "increase". In addition, the Nnsacf_NumberOfPDUsPerSliceAvailabilityCheckUpdate request includes the NSAC UE parameter if the received Registered S-NSSAI list parameter includes the associated S-NSSAI with another APN pair. For example, the SMF/PGW-C may determine whether the received Registered S-NSSAI list parameter includes the associated S-NSSAI with another APN pair in the same manner as step 3. Further, the Nnsacf_NumberOfPDUsPerSliceAvailabilityCheckUpdate request may include the UE ID and the S-NSSAI associated to the received APN.

For example, in a case where the SMF/PGW-C sends the Nnsacf_NumberOfUEsPerSliceAvailabilityCheckUpdate request to the NSACF, the SMF/PGW-C may send the Nnsacf_NumberOfPDUsPerSliceAvailabilityCheckUpdate request to the NSACF.

For example, in a case where the SMF/PGW-C receives the Nnsacf_NumberOfUEsPerSliceAvailability Check Update response from the NSACF, the SMF/PGW-C may send the Nnsacf_NumberOfPDUsPerSliceAvailability-CheckUpdate request to the NSACF.

6. Upon reception of the Nnsacf_NumberOfPDUs-PerSliceAvailabilityCheckUpdate request message, if the update flag parameter from the SMF/PGW-C indicates "increase", the following processes apply:

If the maximum number of PDU Sessions established on the network slice related to the received S-NSSAI has not been reached, the NSACF increases the current number of the PDU Sessions registered with the network slice.

If the NASC UE parameter is included in step 5, the NSACF associates the NSAC UE parameter to the received the S-NSSAI. The NSACF may use the NSAC UE parameter for statistic measurement purpose.

The NSACF sends the Nnsacf_NumberOfPDUs-PerSliceAvailabilityCheckUpdate response to the SMF/PGW-C with the result parameter. For example, if the maximum number of PDU Sessions established on the network slice related to the received S-NSSAI has not been reached, the NSACF sends, to the SMF/PGW-C, the Nnsacf_NumberOfPDUsPerSliceAvailability-CheckUpdate response indicating that the PDU session is allowed to be established. The Nnsacf_NumberOfPDUsPerSliceAvailabilityCheckUpdate response may include information indicating that the UE is allowed to use the S-NSSAI.

For example, upon receiving the Nnsacf_NumberOfUEs-PerSliceAvailabilityCheckUpdate response or the Nnsacf_NumberOfPDUsPerSliceAvailabilityCheckUpdate response, the SMF/PGW-C may store information indicating that the UE has been registered to the NSACF with the APN corresponding to the S-NSSAI. For example, upon receiving the Nnsacf_NumberOfUEsPerSliceAvailabilityCheckUpdate response or the Nnsacf_NumberOfPDUsPerSliceAvailabilityCheckUpdate response, the SMF/PGW-C may store information indicating a pair of the APN and the S-NSSAI that the UE has been registered.

7. The SMF/PGW-C sends, to the SGW-C, the Create Session Response message including PCO parameter, Registered S-NSSAI and NSAC parameter set to "Yes". The Registered S-NSSAI indicates that the S-NSSAI associated with the APN is registered with the NSACF for the UEs registered with a network slice count. For example, the Registered S-NSSAI indicates that the S-NSSAI associated with the APN is registered successfully to the NSACF for NSAC.

The PCO parameter includes the S-NSSAI that is associated with the APN. In one example of FIG. 3, the S-NSSAI included in the PCO parameter may be same to the S-NSSAI which is sent in step 3 or 5.

The SMF/PGW-C includes the NSAC parameter which is set to "Yes" if the SMF/PGW-C performs the Network Slice Admission Control for the PDN connection. For example, the NSAC parameter which is set to "Yes" may indicate that the SMF/PGW-C performs the Network Slice Admission Control for the PDU session for the S-NSSAI corresponding to the APN. For example, the NSAC parameter which is set to "Yes" may indicate that the SMF/PGW-C completes the Network Slice Admission Control for the PDN connection successfully. For example, the NSAC parameter which is set to "Yes" may indicate that the SMF/PGW-C performs the Network Slice Admission Control for the received APN in step 2. For example, the NSAC parameter which is set to "Yes" may indicate that the SMF/PGW-C performs the Network Slice Admission Control for the S-NSSAI corresponding to the received APN in step 2.

For example, the NSAC parameter which is set to "Yes" may indicate that the network slice associated with the APN is subject to NSAC, i.e. the active PDN connection has been already counted in the number of the PDN connections established on the associated network slice.

8. The SGW-C sends, to the MME, the Create Session Response message including the PCO parameter, the Registered S-NSSAI and the NSAC parameter as included by the SMF/PGW-C in step 7. If the Registered S-NSSAI is received, the MME adds the received S-NSSAI and the APN pair to the Registered S-NSSAI list in the MME context. For example, the MME may manage the MME context on a per-UE basis. For example, if the Registered S-NSSAI is received, the MME may add a pair of the received S-NSSAI in the PCO parameter and the APN corresponding to the S-NSSAI to the Registered S-NSSAI list in the MME context. The APN corresponding to the S-NSSAI may be the APN sent in the step 1.

9. The network and UE complete the PDN connection establishment procedure.

10. The MME sends, to the UE, the NAS message including the PCO parameter. The MME stores the NSAC parameter as "Yes" in the SM context to the PDN connection.

11. Based on the parameters in the NAS message in step 10, the following process may apply to the UE:

The UE associates the APN that is indicated in step 0 and the S-NSSAI that is included in the PCO parameter received in the step 10. For example, the UE associates the APN and the S-NSSAI, and stores a pair of the APN and the S-NSSAI.

FIG. 4 illustrates the message flow when the UE performs the N1 mode capability disabling where there is at least one PDN connection established as described in FIG. 3.

0. The UE has at least one PDN connection established as illustrated in FIG. 3.

1. The UE disables the N1 mode capability. For example, the UE changes the UE capability information from "N1 mode supported" to "N1 mode not supported" based on local configuration. For example, the UE may be in CM-IDLE mode.

2. The UE sends, to the MME, the TAU Request indicating the N1 mode not supported in UE network capability IE. For example, the UE sends, to the MME, the TAU Request including the UE network capability IE indicating that the N1 mode is not supported. The TAU Request may include information for identifying the UE. The TAU Request may be called as a TAU Request message.

3. The MME checks the MM context of the UE and confirms whether the UE has support N1 mode. If the MME determines that the UE has the MM context indicating that the UE supports the N1 mode and the TAU Request message includes N1 mode not supported in the UE network capability IE and the MME finds, based on the SM context for an already active PDN connection to the APN, that the network slice associated with the APN is subject to NSAC, i.e. the active PDN connection has been already counted in the number of the PDN connections established on the associated network slice, then the MME proceeds with step 4. Otherwise, the MME proceeds with step 12.

4. The MME sends, to the SGW-C, the Modify Session Request message including the N1 mode parameter set as "not supported". The N1 mode parameter set as "not supported" may indicate that the UE does not support the N1 mode or the UE cannot interwork with the 5GS. The Modify Session Request message may include information identifying the UE.

5. The SGW-C sends, to the SMF/PGW-C, the Modify Session Request message including the N1 mode parameter which is set to "not supported". For example, The SGW-C sends, to the SMF/PGW-C, the Modify Session Request message in a case where the SGW-C receives the Modify Session Request message from the MME.

6. The SMF/PGW-C finds an associated S-NSSAI based on the received information from the SGW-C and local configuration. Then the SMF/PGW-C sends Nnsacf_NumberOfUEsPerSliceAvailabilityCheckUpdate request to the NSACF with the update flag set to "decrease".

The Nnsacf_NumberOfUEsPerSliceAvailabilityCheckUpdate request may include the UE ID and the S-NSSAI associated to the APN.

For example, the MME may determine the APN based on the UE network capability IE indicating that the N1 mode is not supported in the UE, the information identifying the UE and the MME context for the UE. In detail, for example, the MME may determine the APN for the UE based on the MME context and the information identifying the UE. Then the MME sends, to the SMF/PGW-C via SGW-C, the Modify Session Request including the N1 mode parameter which is set to "not supported" and the determined APN.

Upon receiving the Modify Session Request, the SMF/PGW-C may determine the S-NSSAI corresponding to the received APN based on the local configuration (e.g. mapping information of S-NSSAI(s) and the APNs). Then the SMF/PGW-C may send, to the NSACF, the Nnsacf_NumberOfUEsPerSliceAvailabilityCheckUpdate request including the update flag which is set to "decrease", the UE ID and the S-NSSAI associated to (or associated to) the received APN.

7. Upon reception of the Nnsacf_NumberOfUEsPerSliceAvailabilityCheckUpdate request message, if the update flag parameter from the SMF/PGW-C indicates "decrease", the following processes apply:

If the received UE ID is in the list of UE IDs, the NSACF deletes the UE ID in the list of UEs registered with the network slice related to the received S-NSSAI and decreases the current number of the UEs registered with the network slice.

The NSACF sends Nnsacf_NumberOfUEsPerSliceAvailabilityCheckAndUpdate response indicating that the UE is de-registered successfully with the NSACF for the S-NSSAI.

8. The SMF/PGW-C sends, to the NSACF, Nnsacf_NumberOfPDUsPerSliceAvailabilityCheckUpdate request with update flag set to "decrease".

The Nnsacf_NumberOfPDUsPerSliceAvailabilityCheckUpdate request may include the UE ID and the S-NSSAI associated to the APN.

For example, in a case where the SMF/PGW-C sends the Nnsacf_NumberOfUEsPerSliceAvailabilityCheckUpdate request to the NSACF, the SMF/PGW-C may send the Nnsacf_NumberOfPDUsPerSliceAvailabilityCheckUpdate request to the NSACF.

For example, in a case where the SMF/PGW-C receives the Nnsacf_NumberOfUEsPerSliceAvailabilityCheckUpdate response from the NSACF, the SMF/PGW-C may send the Nnsacf_NumberOfPDUsPerSliceAvailabilityCheckUpdate request to the NSACF.

For example, the SMF/PGW-C may determine the S-NSSAI associated to (or corresponding to) the APN based on the local configuration (e.g. mapping information of S-NSSAI(s) and the APNs) in the same manner as step 6.

9. Upon reception of the Nnsacf_NumberOfPDUsPerSliceAvailabilityCheckUpdate request message, if the update flag parameter from the SMF/PGW-C indicates "decrease", the following processes apply:

The NSACF decreases the current number of the PDU Sessions registered with the network slice.

The NSACF sends the Nnsacf_NumberOfPDUsPerSliceAvailabilityCheckUpdate response to the SMF/PGW-C with the result parameter. For example, the NSACF sends the Nnsacf_NumberOfPDUsPerSliceAvailabilityCheckAndUpdate response which indicates that the decrement of the number of PDU sessions for the S-NSSAI is successfully completed.

10. The SMF/PGW-C sends, to the SGW-C, the Modify Session Response message including NSAC parameter set to "No". For example, the NSAC parameter which is set to "No" may indicate that the network slice associated with the APN is not subject to NSAC, i.e. the active PDN connection has not been counted in the number of the PDN connections established on the associated network slice.

11. The SGW-C sends, to the MME, the Modify Session Response message including the NSAC parameter.

12. The MME sends the TAU Accept message to the UE. The MME stores the NSAC parameter set as "No" in the SM context for the PDN connection based on the received NSAC parameter in step 11. TAU Accept message may be called as TAU Accept.

<Variant 1 of the Aspect 2>

Step 4, 5, 10 and 11 may be Modify Bearer Request message, Modify Bearer Request message, Modify Bearer Response message and Modify Bearer Response message respectively.

For example, in step 4, a Modify Bearer Request message may be sent instead of the Modify Session Request message.

For example, in step 5, a Modify Bearer Request message may be sent instead of the Modify Session Request message.

For example, the parameters sent in the Modify Bearer Request message may be same to the parameters in the Modify Session Request message.

For example, in step 10, a Modify Bearer Response message may be sent instead of the Modify Session Response message.

For example, in step 11, a Modify Bearer Response message may be sent instead of the Modify Session Response message.

For example, the parameters sent in the Modify Bearer Response message may be same to the parameters in the Modify Session Response message.

<Variant 2 of the Aspect 2>

Step 4, 5, 10 and 11 may be Remote UE Report Notification message, Remote UE Report Notification message, Remote UE Report Acknowledge message and Remote UE Report Acknowledge message respectively.

For example, in step 4, a Remote UE Report Notification message may be sent instead of the Modify Session Request message.

For example, in step 5, a Remote UE Report Notification message may be sent instead of the Modify Session Request message.

For example, the parameters sent in the Remote UE Report Notification message may be same to the parameters in the Modify Session Request message.

For example, in step 10, a Remote UE Report Acknowledge message may be sent instead of the Modify Session Response message.

For example, in step 11, a Remote UE Report Acknowledge message may be sent instead of the Modify Session Response message.

For example, the parameters sent in the Remote UE Report Acknowledge message may be same to the parameters in the Modify Session Response message.

<Variant 3 of the Aspect 2>

Step 4, 5, 10 and 11 may be Change Notification Request message, Change Notification Request message, Change Notification Response message and Change Notification Response message respectively.

For example, in step 4, a Change Notification Request message may be sent instead of the Modify Session Request message.

For example, in step 5, a Change Notification Request message may be sent instead of the Modify Session Request message.

For example, the parameters sent in the Change Notification Request message may be same to the parameters in the Modify Session Request message.

For example, in step 10, a Change Notification Response message may be sent instead of the Modify Session Response message.

For example, in step 11, a Change Notification Response message may be sent instead of the Modify Session Response message.

For example, the parameters sent in the Change Notification Response message may be same to the parameters in the Modify Session Response message.

<Variant 4 of the Aspect 2>

Step 4, 5, 10 and 11 may be Delete Session Request message, Delete Session Request message, Delete Session Response message and Delete Session Response message respectively. The For example, in step 4, a Delete Session Request message may be sent instead of the Modify Session Request message.

For example, in step 5, a Delete Session Request message may be sent instead of the Modify Session Request message.

For example, the parameters sent in the Delete Session Request message may be same to the parameters in the Modify Session Request message.

For example, in step 10, a Delete Session Response message may be sent instead of the Modify Session Response message.

For example, in step 11, a Delete Session Response message may be sent instead of the Modify Session Response message.

For example, the parameters sent in the Delete Session Response message may be same to the parameters in the Modify Session Response message.

<Variant 5 of the Aspect 2>

The MME in FIG. 3 and FIG. 4 may be an S4-SGSN.

<Variant 6 of the Aspect 2>

The message is step 4 or 11 is any existing message or a new message defined between the MME and S-GW (e.g. the SGW-C). The message is step 5 or 12 is any existing message or a new message defined between S-GW (e.g. the SGW-C) and the SMF/PGW-C.

<Variant 7: of the Aspect 2>

In one example, in step 6, when the SMF/PGW-C determines that the UE no longer supports N1 mode, then the SMF/PGW-C does not send a neither Nnsacf_NumberOfUEsPerSliceAvailabilityCheckUpdate request nor Nnsacf_NumberOfPDUsPerSliceAvailabilityCheckUpdate request to update the NSAC.

For example, in a case where the SMF/PGW-C determines that the UE no longer supports N1 mode, the SMF/PGW-C does not send the Nnsacf_NumberOfUEsPerSliceAvailabilityCheckUpdate request and the Nnsacf_NumberOfPDUsPerSliceAvailabilityCheckUpdate request.

<Variant 8 of the Aspect 2>

In one example, if the UE indicates that the UE supports N1 mode by sending an existing information element in the PCO to the PGW-C (e.g. the SMF/PGW-C), e.g. if the UE sends PDU session ID in the PCO during the PDN connection establishment to the PGW-C, then the PGW-C (e.g. the SMF/PGW-C) determines that the UE supports N1 mode.

If the UE does not support N1 mode, i.e. if the UE disables the N1 mode, then the UE initiates an ESM procedure and sends the PCO containing an indicator indicating that the PDU session ID (or a PDU session identified by the PDU session ID) is released for the PDN connection in a ESM message during the ESM procedure (or UE initiated EPS bearer context modification procedure). Upon receiving the PCO, the MME sends this PCO to the SGW-C using an existing procedure between the MME and the SGW-C. Then the SGW-C further sends, to the PGW-C (e.g. the SMF/PGW-C), the PCO using an existing procedure. When the P-GW (e.g. the SMF/PGW-C) receives the PCO and the indicator indicates the PDU session ID is released for the PDN connection, then the PGW-C (e.g. the SMF/PGW-C) determines that the UE does not support N1 mode.

<Variant 9 of the Aspect 2>

In addition to the Create Session procedure in FIG. 3, similar mechanism applies for the Network Slice Admission Control to the Delete Session procedure. The following changes to FIG. 3 apply for the Delete Session procedure:

- Create Session Request message is replaced with Delete Session Request message.
- Create Session Response message is replaced with Delete Session Response message.
- In step 3 of FIG. 3, Nnsacf_NumberOfUEsPerSliceAvailabilityCheckUpdate request to the NSACF has the update flag set to "decrease" with the NSAC UE parameter.
- In step 5 of FIG. 3, Nnsacf_NumberOfPDUsPerSliceAvailabilityCheckUpdate request to the NSACF has update flag set to "decrease".
- In steps 7 and 8 in FIG. 3, the Create Session Response message and the Registered S-NSSAI parameter are replaced with the Delete Session Response message and with the Deregistered S-NSSAI. When the MME receives the Deregistered S-NSSAI, the MME deletes the received S-NSSAI with the associated APN pair from the Registered S-NSSAI list in the MME context.
- Steps 9, 10 and 11 in FIG. 3 are replaced with a release procedure for signaling connection between the UE and the MME.

In addition, the steps 1 to 11 in FIG. 3 with changes applied by the Variant 9 of the Aspect 2 are also applicable in a case where the UE disables N1 mode or in a case where the subscriber data in HSS/UDM is modified and the Core Network Type Restriction disallows the UE to access 5GC.

Note that the Core Network Type Restriction data is transferred from the HSS to the MME over the S6a interface by the Update Location Ack message or the Insert Subscriber Data message.

<Variant 10 of the Aspect 2>

In one example, the steps 4 to 11 in FIG. 4 may be initiated by the MME when the MME receives, from the HSS, the Insert Subscriber Data message indicating that the Core Network Type Restriction disallows the UE to access 5GC.

<Variant 11 of the Aspect 2>

In one example, the steps 3 to 6 in FIG. 3 may not be executed in a case where the SMF/PGW-C has received the subscriber data for the UE that the Core Network Type Restriction disallows the UE to access 5GC.

Note that the SMF/PGW-C may receive, from the UDM, the Core Network Type Restriction parameter in the subscriber data by the Nudm_SDM_Get service or the Nudm_SDM_Notification service.

<Variant 12 of the Aspect 2>

In one example, the steps 6 to 9 in FIG. 4 may not be executed in case where the SMF/PGW-C receives, from the UDM, the subscriber data update notification that the Core Network Type Restriction disallows the UE to access 5GC.

Note that the SMF/PGW-C may receive, from the UDM, the updated Core Network Type Restriction parameter in the subscriber data by the Nudm_SDM_Notification service.

For example, the Aspect 2 and the variants of the Aspect 2 can provide solutions for various situations that the NSAC procedure is not defined when the PDN connection procedure is established on the EPS which supports interworking with 5GS.

For example, the Aspect 2 and the variants of the Aspect 2 can solve the problem that the network behavior and the UE behavior are not defined with respect to the NSAC procedure when the UE disables N1 mode capability.

<Aspect 3: Handling of Network Slice Admission Control for Multiple PDN Connectivity to the Same S-NSSAI.>

When the UE supporting N1 mode and S1 mode establishes a PDN connection for an APN in the EPS, the SMF/PGW-C entity (or the SMF/PGW-C) maps the APN to a network slice based on local configuration. There can be a scenario when multiple APN maps to the same network slice. It is not clear in such a case when multiple PDN connections are associated with the same network slice how to perform NSAC procedure to check availability and update the number of UEs registered to the network slice and the number of the PDU sessions established on the network slice.

The Aspect 3 discloses a Network Slice Admission Control for multiple PDN connectivity to the same S-NSSAI.

Figure 5:
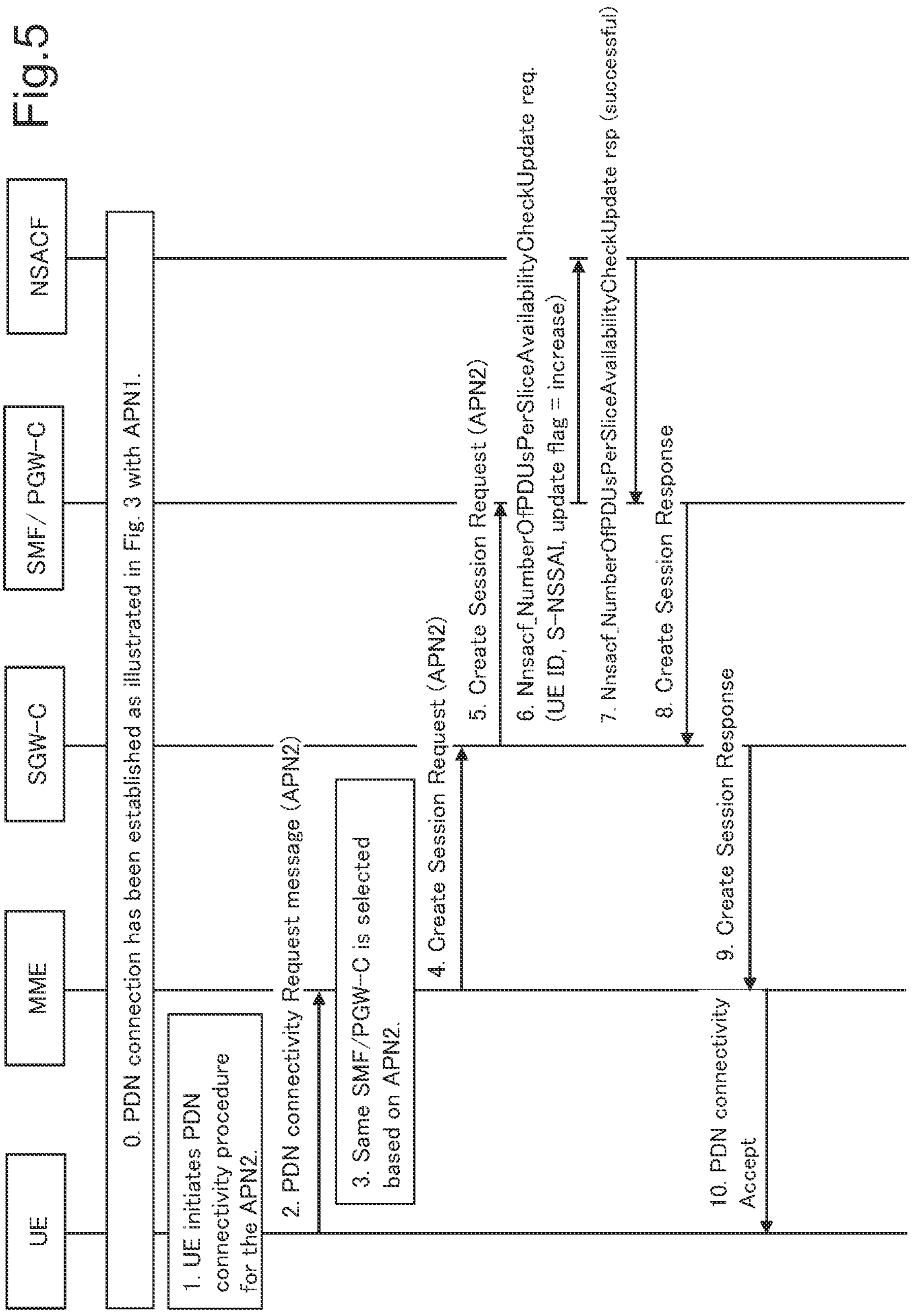
FIG. 5 illustrates Network Slice Admission Control with PDN connectivity Request procedure.

The FIG. 5 illustrates PDN connectivity Request procedure.

Note that assumption in this Aspect is that there is at least one PDU session being established as illustrated in FIG. 3 in the Aspect 2.

0. The UE has at least one PDN connection established with APN1 corresponding to S-NSSAI as illustrated in FIG. 3.

1. The UE is triggered by an application that new PDN Connection needs to be established with APN2.

2. The UE sends the PDN connectivity Request to the MME with APN2.

3. The MME performs the PGW-C (e.g. SMF/PGW-C) selection. As the result, the same SMF/PGW-C with APN2 is selected.

4. The MME sends the Create Session Request message to the SGW-C with APN2.

5. The SGW-C sends the Create Session Request message to the SMF/PGW-C with APN2.

6. The SMF/PGW-C finds an associated S-NSSAI based on the received APN2 and local configuration (e.g. mapping information of S-NSSAIs and APNs). For example, in this case, the associated S-NSSAI also corresponds to the APN1.

If the SMF/PGW-C finds that the UE has been registered to the NSACF with APN1 corresponding to the S-NSSAI, then the SMF/PGW-C does not register the UE to the NSAC, and registers the UE to the PDU Session.

In this case, the SMF/PGW-C sends, to the NSACF, Nnsacf_NumberOfPDUsPerSliceAvailabilityCheckUpdate request with update flag set to "increase". The Nnsacf_NumberOfPDUsPerSliceAvailabilityCheckUpdate request may include the UE ID and the S-NSSAI associated to the APN 2.

For example, the SMF/PGW-C finds that the UE has been registered to the NSACF with APN1 based on the associated S-NSSAI and the information indicating a pair of the APN and the S-NSSAI that the UE has been registered.

For example, the SMF/PGW-C may send the Nnsacf_NumberOfPDUsPerSliceAvailabilityCheckUpdate request including the update flag set to "increase", the UE ID and the S-NSSAI associated to the APN 2 in a case where the SMF/PGW-C receives the Nnsacf_NumberOfUEsPerSliceAvailabilityCheckUpdate response in step 4 of FIG. 3.

7. Upon reception of the Nnsacf_NumberOfPDUsPerSliceAvailabilityCheckUpdate request message, if the update flag parameter from the SMF/PGW-C indicates "increase", the following processes apply:

The NSACF increases the current number of the PDU Sessions registered with the network slice related to the received S-NSSAI.

The NSACF sends the Nnsacf_NumberOfPDUsPerSliceAvailabilityCheckUpdate response to the SMF/PGW-C with the result parameter. For example, if the maximum number of PDU Sessions established on the network slice related to the received S-NSSAI has not been reached, the NSACF sends, to the SMF/PGW-C, the Nnsacf_NumberOfPDUsPerSliceAvailabilityCheckUpdate response indicating that the PDU session is allowed to be established. The Nnsacf_NumberOfPDUsPerSliceAvailabilityCheckUpdate response may include information indicating that the UE is allowed to use the S-NSSAI.

8. The SMF/PGW-C sends the Create Session Response message to the SGW-C. For example, upon reception of the Nnsacf_NumberOfPDUsPerSliceAvailabilityCheckUpdate response, the SMF/PGW-C sends the Create Session Response message to the SGW-C.

9. The SGW-C sends the Create Session Response message to the MME. For example, upon reception of the Create Session Response message from the SMF/PGW-C, the SGW-C sends the Create Session Response message to the MME.

10. The MME sends the PDN connectivity Accept message to the UE. For example, upon reception of the Create Session Response message from the SGW-C, the MME sends the PDN connectivity Accept message to the UE.

<Variant 1 of the Aspect 3>

The MME in FIG. 3 and FIG. 5 may be an S4-SGSN.

<Variant 2 of the Aspect 3>

In one example, in step 6, the SMF/PGW-C also sends Nnsacf_NumberOfUEsPerSliceAvailabilityCheckUpdate request with update flag set to "increase" to update the number of UEs for the S-NSSAI.

<System Overview>

Figure 6:
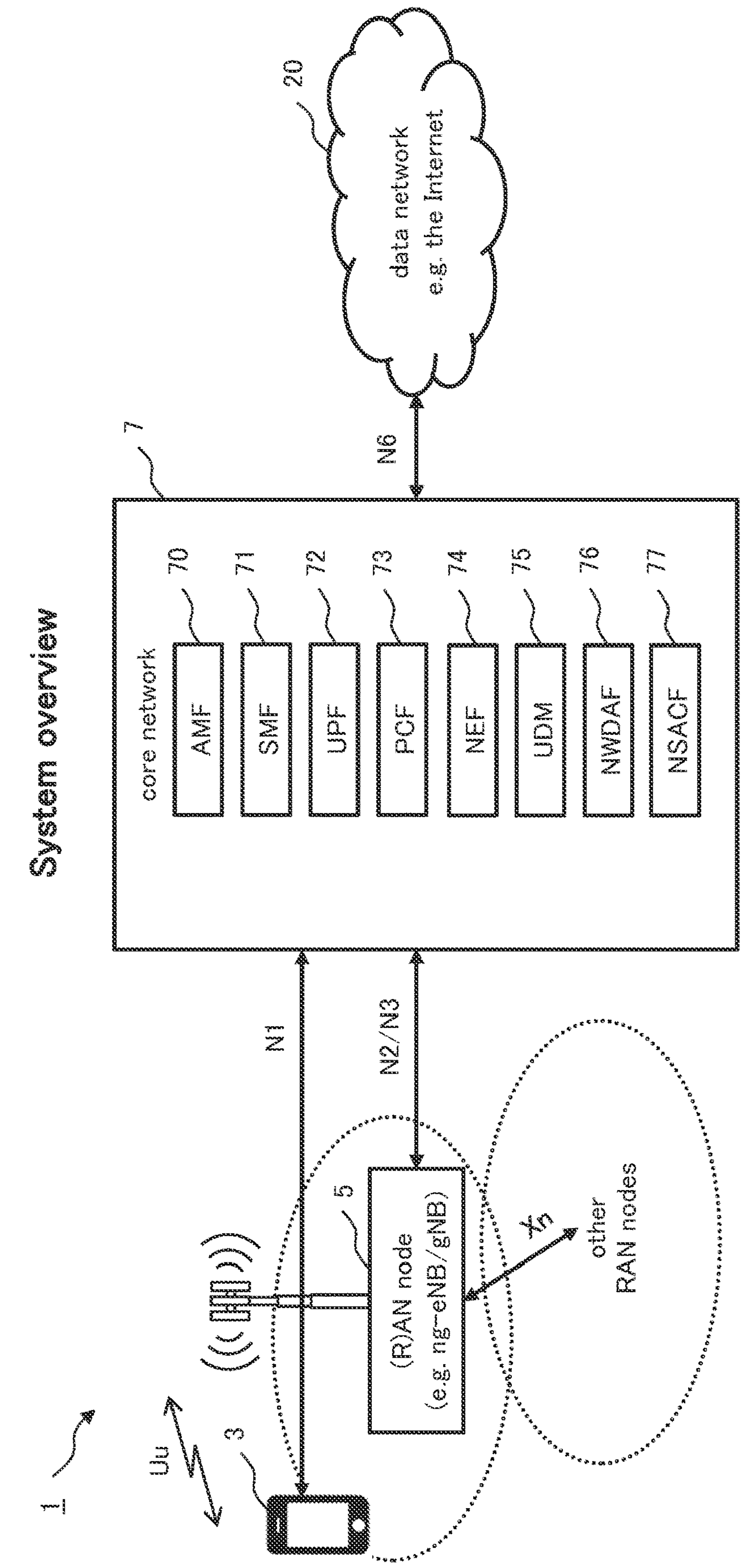
FIG. 6 illustrates System overview.

FIG. 6 schematically illustrates a telecommunication system 1 for a mobile (cellular or wireless) to which the above aspects are applicable.

The telecommunication system 1 represents a system overview in which an end to end communication is possible. For example, UE 3 (or user equipment, 'mobile device' 3) communicates with other UEs 3 or service servers in the data network 20 via respective (R)AN nodes 5 and a core network 7.

The (R)AN node 5 supports any radio accesses including a 5G radio access technology (RAT), an E-UTRA radio access technology, a beyond 5G RAT, a 6G RAT and non-3GPP RAT including wireless local area network (WLAN) technology as defined by the Institute of Electrical and Electronics Engineers (IEEE).

The (R)AN node 5 may split into a Radio Unit (RU), Distributed Unit (DU) and Centralized Unit (CU). In some aspects, each of the units may be connected to each other and structure the (R)AN node 5 by adopting an architecture as defined by the Open RAN (O-RAN) Alliance, where the units above are referred to as O-RU, O-DU and O-CU respectively.

The (R)AN node 5 may be split into control plane function and user plane function. Further, multiple user plane functions can be allocated to support a communication. In some aspects, user traffic may be distributed to multiple user plane functions and user traffic over each user plane functions are aggregated in both the UE 3 and the (R)AN node 5. This split architecture may be called as 'dual connectivity' or 'Multi connectivity'.

The (R)AN node 5 can also support a communication using the satellite access. In some aspects, the (R)AN node 5 may support a satellite access and a terrestrial access.

In addition, the (R)AN node 5 can also be referred as an access node for a non-wireless access. The non-wireless access includes a fixed line access as defined by the Broadband Forum (BBF) and an optical access as defined by the Innovative Optical and Wireless Network (IOWN).

The core network 7 may include logical nodes (or 'functions') for supporting a communication in the telecommunication system 1. For example, the core network 7 may be 5G Core Network (5GC) that includes, amongst other functions, control plane functions and user plane functions. Each function in logical nodes can be considered as a network function. The network function may be provided to another node by adapting the Service Based Architecture (SBA). In addition, for example, the core network 7 may include control plane functions and user plane functions in Evolved Packet Core (EPC). For example, the core network 7 includes MME, SGW-C, and PGW-C. The MME may include a transceiver circuit which is operable to transmit signals to and to receive signals from other nodes (including nodes in the core network 7) via a network interface, and a controller which is operable to control the operation of the MME in accordance with software stored in a memory of the MME. The SGW-C may include a transceiver circuit which is operable to transmit signals to and to receive signals from other nodes (including nodes in the core network 7) via a network interface, and a controller which is operable to control the operation of the SGW-C in accordance with software stored in a memory of the SGW-C.

A Network Function can be deployed as distributed, redundant, stateless, and scalable that provides the services from several locations and several execution instances in each location by adapting the network virtualization technology as defined by the European Telecommunications Standards Institute, Network Functions Virtualization (ETSI NFV).

The core network 7 may support the Non-Public Network (NPN). The NPN may be a Stand-alone Non-Public Network (SNPN) or a Public Network Integrated NPN (PNI-NPN).

As is well known, a UE 3 may enter and leave the areas (i.e. radio cells) served by the (R)AN node 5 as the UE 3 is moving around in the geographical area covered by the telecommunication system 1. In order to keep track of the UE 3 and to facilitate movement between the different (R)AN nodes 5, the core network 7 comprises at least one access and mobility management function (AMF) 70. The AMF 70 is in communication with the (R)AN node 5 coupled to the core network 7. In some core networks, a mobility management entity (MME) or a mobility management node for beyond 5G or a mobility management node for 6G may be used instead of the AMF 70.

The core network 7 also includes, amongst others, a Session Management Function (SMF) 71, a User Plane Function (UPF) 72, a Policy Control Function (PCF) 73, a Network Exposure Function (NEF) 74, a Unified Data Management (UDM) 75, a Network Data Analytics Function (NWDAF) 76 and NSACF (Network Slice Admission Control Function) 77. In addition, the core network 7 may also include SMF+PGW-C. When the UE 3 is roaming to a visited Public Land Mobile Network (VPLMN), a home Public Land Mobile Network (HPLMN) of the UE 3 provides the UDM 75 and at least some of the functionalities of the SMF 71, UPF 72, and PCF 73 for the roaming-out UE 3.

The UE 3 and a respective serving (R)AN node 5 are connected via an appropriate air interface (for example the so-called "Uu" interface and/or the like). Neighboring (R)AN node 5 are connected to each other via an appropriate (R)AN node 5 to (R)AN node interface (such as the so-called "Xn" interface and/or the like). Each (R)AN node 5 is also connected to nodes in the core network 7 (such as the so-called core network nodes) via an appropriate interface (such as the so-called "N2"/"N3" interface(s) and/or the like). From the core network 7, connection to a data network 20 is also provided. The data network 20 can be an internet, a public network, an external network, a private network or an internal network of the PLMN. In case that the data network 20 is provided by a PLMN operator or Mobile Virtual Network Operator (MVNO), the IP Multimedia Subsystem (IMS) service may be provided by that data network 20. The UE 3 can be connected to the data network 20 using IPv4, IPV6, IPv4v6, Ethernet or unstructured data type.

The "Uu" interface may include a Control plane of Uu interface and User plane of Uu interface.

The User plane of Uu interface is responsible to convey user traffic between the UE 3 and a serving (R)AN node 5. The User plane of Uu interface may have a layered structure with SDAP, PDCP, RLC and MAC sublayer over the physical connection.

The Control plane of Uu interface is responsible to establish, modify and release a connection between the UE 3 and a serving (R)AN node 5. The Control plane of Uu interface may have a layered structure with RRC, PDCP, RLC and MAC sublayers over the physical connection.

For example, the following messages are communicated over the RRC layer to support AS signaling.

- RRC Setup Request message: This message is sent from the UE 3 to the (R)AN node 5. In addition to the parameters that are disclosed by Aspects in this disclosure, following parameters may be included together in the RRC Setup Request message.
  - establishmentCause and ue-Identity. The ue-Identity may have a value of ng-5G-S-TMSI-Part1 or random Value.
- RRC Setup message: This message is sent from the (R)AN node 5 to the UE 3. In addition to the parameters that are disclosed by Aspects in this disclosure, following parameters may be included together in the RRC Setup message.
  - masterCellGroup and radioBearerConfig
- RRC Setup Complete message: This message is sent from the UE 3 to the (R)AN node 5. In addition to the parameters that are disclosed by Aspects in this disclosure, following parameters may be included together in the RRC Setup Complete message.
  - guami-Type, iab-NodeIndication, idleMeasAvailable, mobilityState, ng-5G-S-TMSI-Part2, registeredAMF, selectedPLMN-Identity The UE 3 and the AMF 70 are connected via an appropriate interface (for example the so-called N1 interface and/or the like). The N1 interface is responsible to provide a communication between the UE 3 and the AMF 70 to support NAS signaling. The N1 interface may be established over a 3GPP access and over a non-3GPP access. For example, the following messages are communicated over the N1 interface.

- Registration Request message: This message is sent from the UE 3 to the AMF 70. In addition to the parameters that are disclosed by Aspects in this disclosure, following parameters may be included together in the Registration Request message.
  - 5GS registration type, ngKSI, 5GS mobile identity, Non-current native NAS key set identifier, 5GMM capability, UE security capability, Requested NSSAI, Last visited registered TAI, S1 UE network capability, Uplink data status, PDU session status, MICO indication, UE status, Additional GUTI, Allowed PDU session status, UE's usage setting, Requested DRX parameters, EPS NAS message container, LADN indication, Payload container type, Payload container, Network slicing indication, 5GS update type, Mobile station classmark 2, Supported codecs, NAS message container, EPS bearer context status, Requested extended DRX parameters, T3324 value, UE radio capability ID, Requested mapped NSSAI, Additional information requested, Requested WUS assistance information, N5GC indication and Requested NB-N1 mode DRX parameters.
- Registration Accept message: This message is sent from the AMF 70 to the UE 3. In addition to the parameters that are disclosed by Aspects in this disclosure, following parameters may be included together in the Registration Accept message.
  - 5GS registration result, 5G-GUTI, Equivalent PLMNs, TAI list, Allowed NSSAI, Rejected NSSAI, Configured NSSAI, 5GS network feature support, PDU session status, PDU session reactivation result, PDU session reactivation result error cause, LADN information, MICO indication, Network slicing indication, Service area list, T3512 value, Non-3GPP de-registration timer value, T3502 value, Emergency number list, Extended emergency number list, SOR transparent container, EAP message, NSSAI inclusion mode, Operator-defined access category definitions, Negotiated DRX parameters, Non-3GPP NW policies, EPS bearer context status, Negotiated extended DRX parameters, T3447 value, T3448 value, T3324 value, UE radio capability ID, UE radio capability ID deletion indication, Pending NSSAI, Ciphering key data, CAG information list, Truncated 5G-S-TMSI configuration, Negotiated WUS assistance information, Negotiated NB-N1 mode DRX parameters and Extended rejected NSSAI.
- Registration Complete message: This message is sent from the UE 3 to the AMF 70. In addition to the parameters that are disclosed by Aspects in this disclosure, following parameters may be included together in the Registration Complete message.
  - SOR transparent container.
- Authentication Request message: This message is sent from the AMF 70 to the UE 3. In addition to the parameters that are disclosed by Aspects in this disclosure, following parameters may be included together in the Authentication Request message.
  - ngKSI, ABBA, Authentication parameter RAND (5G authentication challenge), Authentication parameter AUTN (5G authentication challenge) and EAP message.
- Authentication Response message: This message is sent from the UE 3 to the AMF 70. In addition to the parameters that are disclosed by Aspects in this disclosure, following parameters may be populated together in the Authentication Response message.

Authentication response message identity, Authentication response parameter and EAP message.

Authentication Result message: This message is sent from the AMF 70 to the UE 3. In addition to the parameters that are disclosed by Aspects in this disclosure, following parameters may be populated together in the Authentication Result message.

ngKSI, EAP message and ABBA.

Authentication Failure message: This message is sent from the UE 3 to the AMF 70. In addition to the parameters that are disclosed by Aspects in this disclosure, following parameters may be populated together in the Authentication Failure message.

Authentication failure message identity, 5GMM cause and Authentication failure parameter.

Authentication Reject message: This message is sent from the AMF 70 to the UE 3. In addition to the parameters that are disclosed by Aspects in this disclosure, following parameters may be populated together in the Authentication Reject message.

EAP message.

Service Request message: This message is sent from the UE 3 to the AMF 70. In addition to the parameters that are disclosed by Aspects in this disclosure, following parameters may be populated together in the Service Request message.

ngKSI, Service type, 5G-S-TMSI, Uplink data status, PDU session status, Allowed PDU session status, NAS message container.

Service Accept message: This message is sent from the AMF 70 to the UE 3. In addition to the parameters that are disclosed by Aspects in this disclosure, following parameters may be populated together in the Service Accept message.

PDU session status, PDU session reactivation result, PDU session reactivation result error cause, EAP message and T3448 value.

Service Reject message: This message is sent from the AMF 70 to the UE 3. In addition to the parameters that are disclosed by Aspects in this disclosure, following parameters may be populated together in the Service Reject message.

5GMM cause, PDU session status, T3346 value, EAP message, T3448 value and CAG information list.

Configuration Update Command message: This message is sent from the AMF 70 to the UE 3. In addition to the parameters that are disclosed by Aspects in this disclosure, following parameters may be populated together in the Configuration Update Command message.

Configuration update indication, 5G-GUTI, TAI list, Allowed NSSAI, Service area list, Full name for network, Short name for network, Local time zone, Universal time and local time zone, Network daylight saving time, LADN information, MICO indication, Network slicing indication, Configured NSSAI, Rejected NSSAI, Operator-defined access category definitions, SMS indication, T3447 value, CAG information list, UE radio capability ID, UE radio capability ID deletion indication, 5GS registration result, Truncated 5G-S-TMSI configuration, Additional configuration indication and Extended rejected NSSAI.

Configuration Update Complete message: This message is sent from the UE 3 to the AMF 70. In addition to the parameters that are disclosed by Aspects in this disclosure, following parameters may be populated together in the Configuration Update Complete message.

Configuration update complete message identity.

<User Equipment (UE)>

Figure 7:
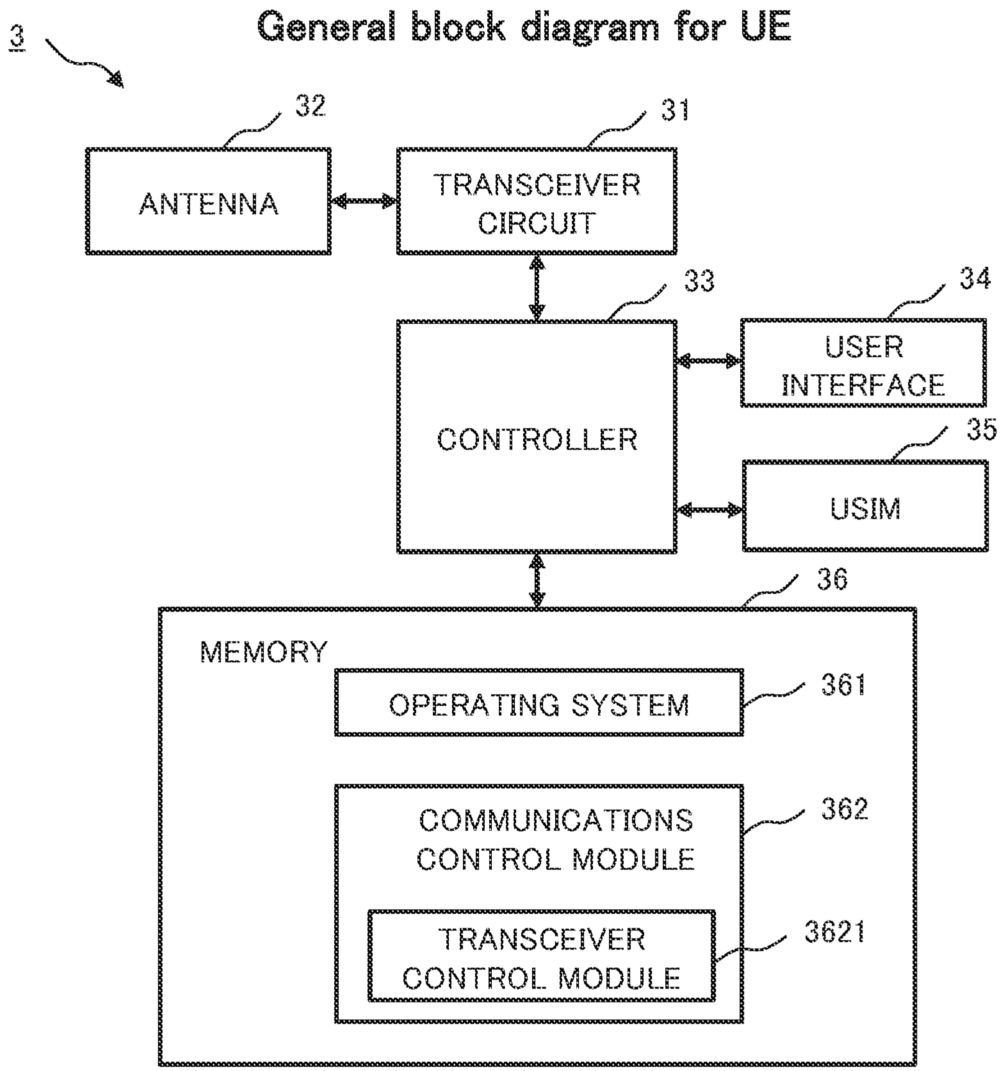
FIG. 7 is a block diagram for a User equipment (UE).

FIG. 7 is a block diagram illustrating the main components of the UE 3 (mobile device 3). As shown, the UE 3 includes a transceiver circuit 31 which is operable to transmit signals to and to receive signals from the connected node(s) via one or more antennas 32. Further, the UE 3 may include a user interface 34 for inputting information from outside or outputting information to outside. Although not necessarily shown in the Figure, the UE 3 may have all the usual functionality of a conventional mobile device and this may be provided by any one or any combination of hardware, software and firmware, as appropriate. Software may be pre-installed in the memory and/or may be downloaded via the telecommunication network or from a removable data storage device (RMD), for example. A controller 33 controls the operation of the UE 3 in accordance with software stored in a memory 36. The software includes, among other things, an operating system 361 and a communications control module 362 having at least a transceiver control module 3621. The communications control module 362 (using its transceiver control module 3621) is responsible for handling (generating/sending/receiving) signalling and uplink/downlink data packets between the UE 3 and other nodes, such as the (R)AN node 5 and the AMF 10. Such signalling may include, for example, appropriately formatted signalling messages (e.g. a registration request message and associated response messages) relating to access and mobility management procedures (for the UE 3). The controller 33 interworks with one or more Universal Subscriber Identity Module (USIM) 35. If there are multiple USIMs 35 equipped, the controller 33 may activate only one USIM 35 or may activate multiple USIMs 35 at the same time.

The UE 3 may, for example, support the Non-Public Network (NPN), The NPN may be a Stand-alone Non-Public Network (SNPN) or a Public Network Integrated NPN (PNI-NPN).

The UE 3 may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

The UE 3 may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

The UE 3 may, for example, be an item of information and communication equipment (for example information and communication equipment such as: electronic computer and related equipment; communication and related equipment; electronic components etc.).

The UE 3 may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

The UE 3 may, for example, be an electrical application system or equipment (for example an electrical application system or equipment such as: an x-ray system; a particle accelerator; radio isotope equipment; sonic equipment; electromagnetic application equipment; electronic power application equipment etc.).

The UE 3 may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

The UE 3 may, for example, be a wireless-equipped personal digital assistant or related equipment (such as a wireless card or module designed for attachment to or for insertion into another electronic device (for example a personal computer, electrical measuring machine)).

The UE 3 may be a device or a part of a system that provides applications, services, and solutions described below, as to "internet of things (IoT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices or Narrow Band-IoT UE (NB-IoT UE). It will be appreciated that a UE 3 may support one or more IoT or MTC applications.

The UE 3 may be a smart phone or a wearable device (e.g. smart glasses, a smart watch, a smart ring, or a hearable device).

The UE 3 may be a car, or a connected car, or an autonomous car, or a vehicle device, or a motorcycle or V2X (Vehicle to Everything) communication module (e.g. Vehicle to Vehicle communication module, Vehicle to Infrastructure communication module, Vehicle to People communication module and Vehicle to Network communication module).

<(R)an Node>

Figure 8:
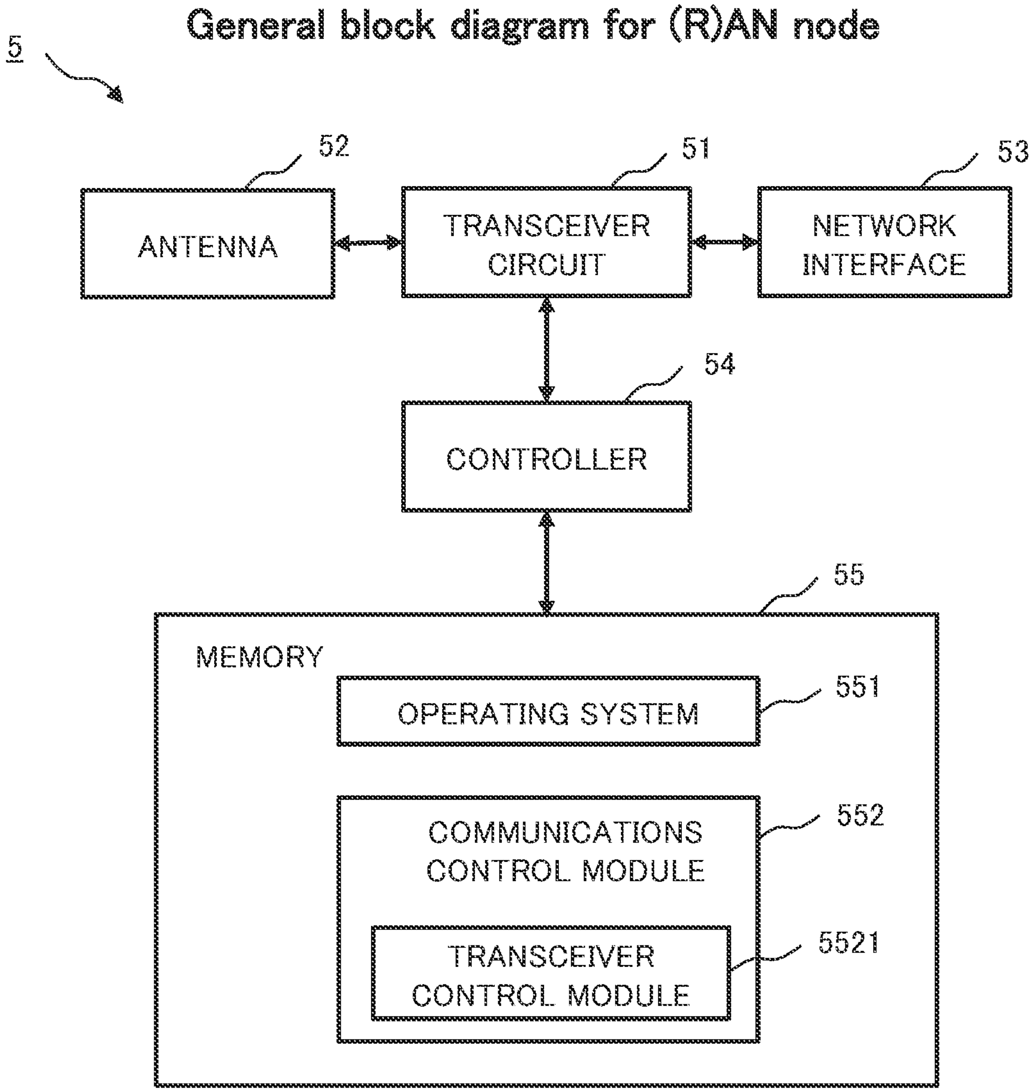
FIG. 8 is a block diagram for a (R)AN node.

FIG. 8 is a block diagram illustrating the main components of an exemplary (R)AN node 5, for example a base station ('eNB' in LTE, 'gNB' in 5G, a base station for 5G beyond, a base station for 6G). As shown, the (R)AN node 5 includes a transceiver circuit 51 which is operable to transmit signals to and to receive signals from connected UE(s) 3 via one or more antennas 52 and to transmit signals to and to receive signals from other network nodes (either directly or indirectly) via a network interface 53. A controller 54 controls the operation of the (R)AN node 5 in accordance with software stored in a memory 55. Software may be pre-installed in the memory and/or may be downloaded via the telecommunication network or from a removable data storage device (RMD), for example. The software includes, among other things, an operating system 551 and a communications control module 552 having at least a transceiver control module 5521.

The communications control module 552 (using its transceiver control sub-module) is responsible for handling (generating/sending/receiving) signalling between the (R)AN node 5 and other nodes, such as the UE 3, another (R)AN node 5, the AMF 70 and the UPF 72 (e.g. directly or indirectly). The signalling may include, for example, appropriately formatted signalling messages relating to a radio connection and a connection with the core network 7 (for a particular UE 3), and in particular, relating to connection establishment and maintenance (e.g. RRC connection establishment and other RRC messages), NG Application Protocol (NGAP) messages (i.e. messages by N2 reference point) and Xn application protocol (XnAP) messages (i.e. messages by Xn reference point), etc. Such signalling may also include, for example, broadcast information (e.g. Master Information and System information) in a sending case.

The controller 54 is also configured (by software or hardware) to handle related tasks such as, when implemented, UE mobility estimates and/or moving trajectory estimation. The (R)AN node 5 may support the Non-Public Network (NPN), The NPN may be a Stand-alone Non-Public Network (SNPN) or a Public Network Integrated NPN (PNI-NPN).

<System Overview of (R)AN Node 5 Based on O-RAN Architecture>

Figure 9:
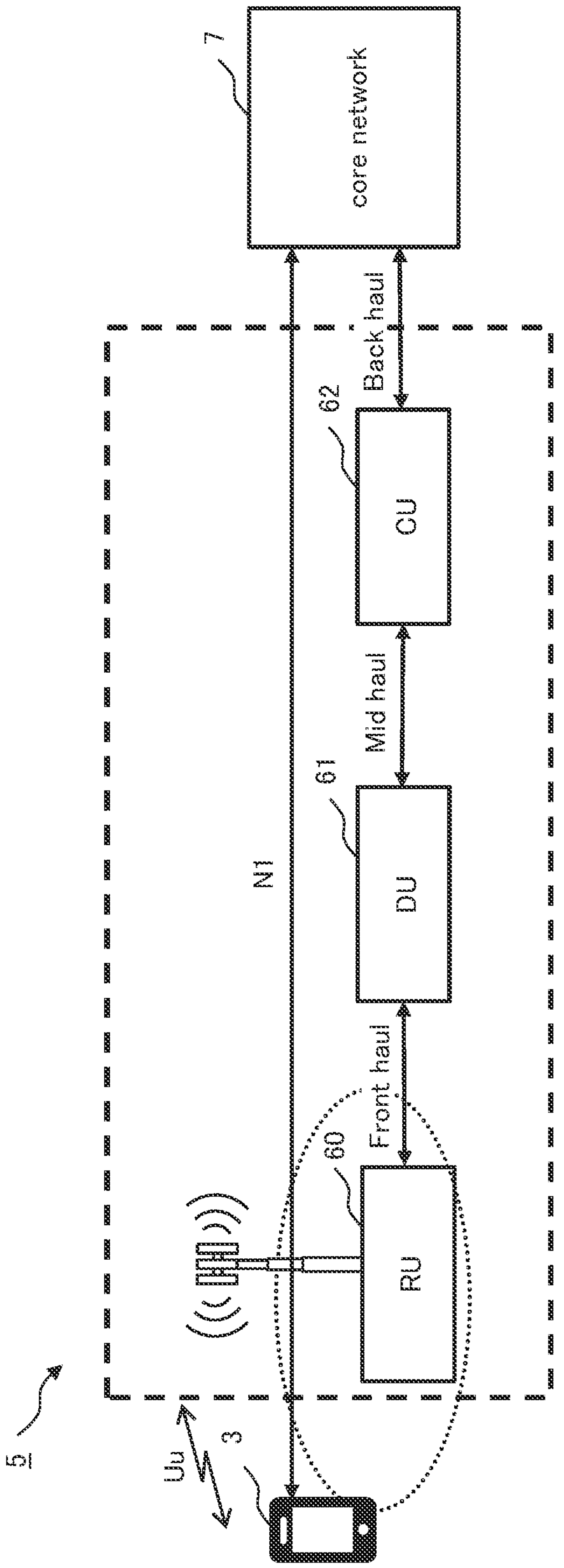
FIG. 9 illustrates System overview of (R)AN node based on O-RAN architecture.

FIG. 9 schematically illustrates a (R)AN node 5 based on O-RAN architecture to which the (R)AN node 5 aspects are applicable.

The (R)AN node 5 based on O-RAN architecture represents a system overview in which the (R)AN node is split into a Radio Unit (RU) 60, Distributed Unit (DU) 61 and Centralized Unit (CU) 62. In some aspects, each unit may be combined. For example, the RU 60 can be integrated/combined with the DU 61 as an integrated/combined unit, the DU 61 can be integrated/combined with the CU 62 as another integrated/combined unit. Any functionality in the description for a unit (e.g. one of RU 60, DU 61 and CU 62) can be implemented in the integrated/combined unit above. Further, CU 62 can separate into two functional units such as CU Control plane (CP) and CU User plane (UP). The CU CP has a control plane functionality in the (R)AN node 5. The CU UP has a user plane functionality in the (R)AN node 5. Each CU CP is connected to the CU UP via an appropriate interface (such as the so-called "E1" interface and/or the like).

The UE 3 and a respective serving RU 60 are connected via an appropriate air interface (for example the so-called "Uu" interface and/or the like). Each RU 60 is connected to the DU 61 via an appropriate interface (such as the so-called "Front haul", "Open Front haul", "F1" interface and/or the like). Each DU 61 is connected to the CU 62 via an appropriate interface (such as the so-called "Mid haul", "Open Mid haul", "E2" interface and/or the like). Each CU 62 is also connected to nodes in the core network 7 (such as the so-called core network nodes) via an appropriate interface (such as the so-called "Back haul", "Open Back haul", "N2"/"N3" interface(s) and/or the like). In addition, a user plane part of the DU 61 can also be connected to the core network nodes 7 via an appropriate interface (such as the so-called "N3" interface(s) and/or the like).

Depending on functionality split among the RU 60, DU 61 and CU 62, each unit provides some of the functionality that is provided by the (R)AN node 5. For example, the RU 60 may provide functionalities to communicate with a UE 3 over air interface, the DU 61 may provide functionalities to support MAC layer and RLC layer, the CU 62 may provide functionalities to support PDCP layer, SDAP layer and RRC layer.

<Radio Unit (RU)>

Figure 10:
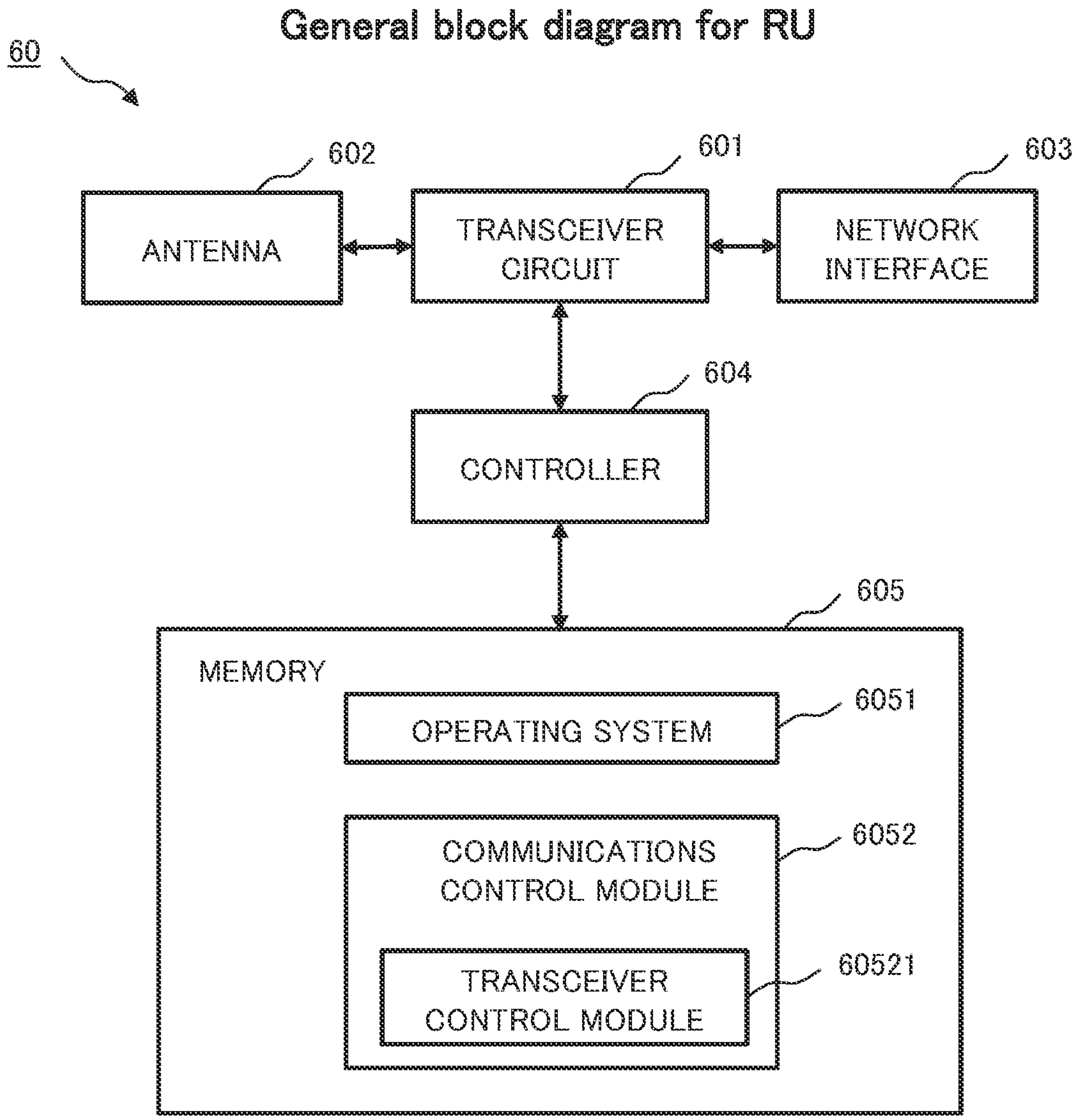
FIG. 10 is a block diagram for a Radio Unit (RU).

FIG. 10 is a block diagram illustrating the main components of an exemplary RU 60, for example a RU part of base station ('eNB' in LTE, 'gNB' in 5G, a base station for 5G beyond, a base station for 6G). As shown, the RU 60 includes a transceiver circuit 601 which is operable to transmit signals to and to receive signals from connected UE(s) 3 via one or more antennas 602 and to transmit signals to and to receive signals from other network nodes or network unit (either directly or indirectly) via a network interface 603. A controller 604 controls the operation of the RU 60 in accordance with software stored in a memory 605. Software may be pre-installed in the memory and/or may be downloaded via the telecommunication network or from a removable data storage device (RMD), for example. The software includes, among other things, an operating system 6051 and a communications control module 6052 having at least a transceiver control module 60521.

The communications control module 6052 (using its transceiver control sub-module) is responsible for handling (generating/sending/receiving) signalling between the RU 60 and other nodes or units, such as the UE 3, another RU 60 and DU 61 (e.g. directly or indirectly). The signalling may include, for example, appropriately formatted signalling messages relating to a radio connection and a connection with the RU 60 (for a particular UE 3), and in particular, relating to MAC layer and RLC layer.

The controller 604 is also configured (by software or hardware) to handle related tasks such as, when implemented, UE mobility estimates and/or moving trajectory estimation.

The RU 60 may support the Non-Public Network (NPN), The NPN may be a Stand-alone Non-Public Network (SNPN) or a Public Network Integrated NPN (PNI-NPN).

As described above, the RU 60 can be integrated/combined with the DU 61 as an integrated/combined unit. Any functionality in the description for the RU 60 can be implemented in the integrated/combined unit above.

<Distributed Unit (DU)>

Figure 11:
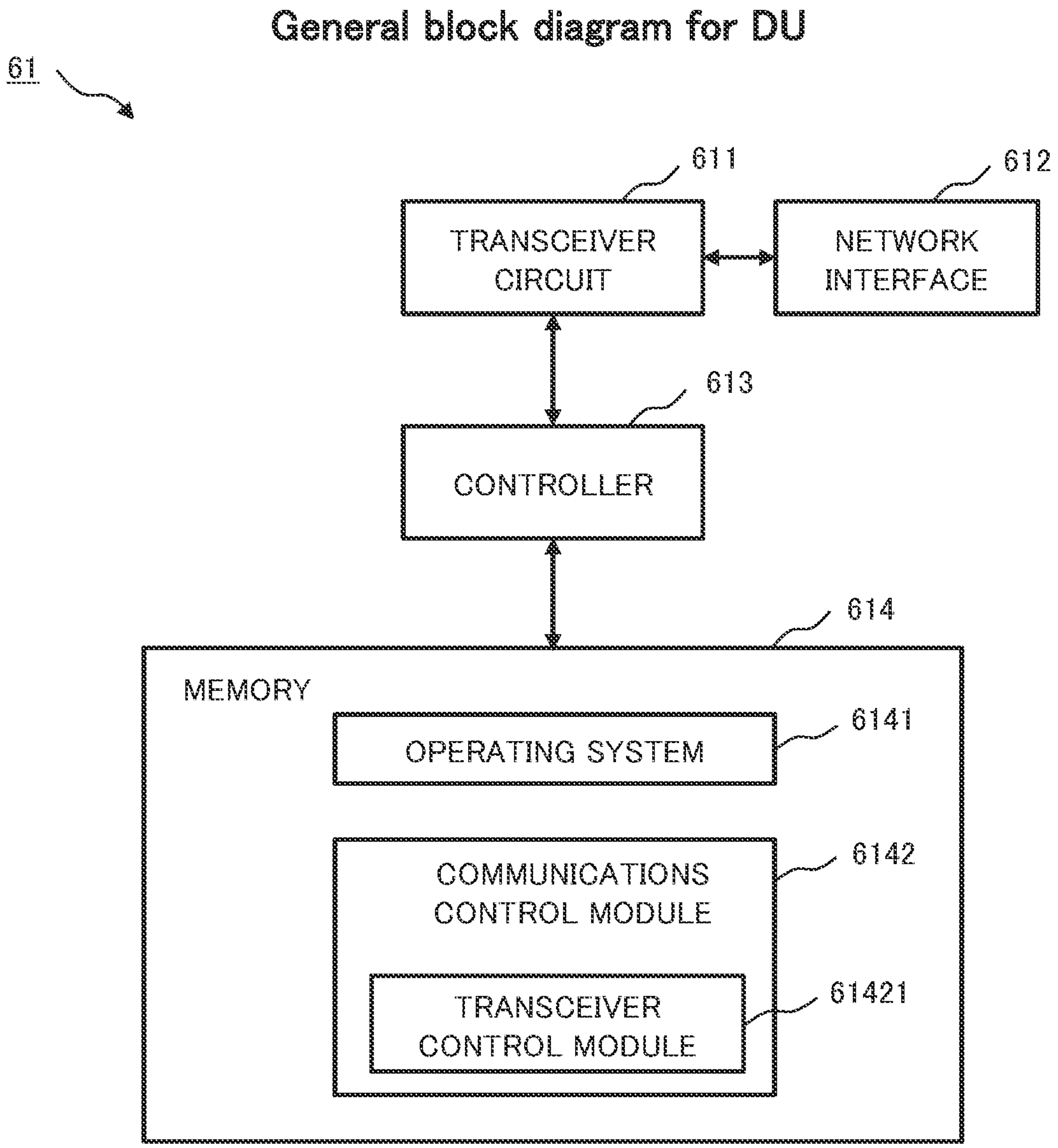
FIG. 11 is a block diagram for a Distributed Unit (DU).

FIG. 11 is a block diagram illustrating the main components of an exemplary DU 61, for example a DU part of a base station ('eNB' in LTE, 'gNB' in 5G, a base station for 5G beyond, a base station for 6G). As shown, the apparatus includes a transceiver circuit 611 which is operable to transmit signals to and to receive signals from other nodes or units (including the RU 60) via a network interface 612. A controller 613 controls the operation of the DU 61 in accordance with software stored in a memory 614. Software may be pre-installed in the memory 614 and/or may be downloaded via the telecommunication network or from a removable data storage device (RMD), for example. The software includes, among other things, an operating system 6141 and a communications control module 6142 having at least a transceiver control module 61421. The communications control module 6142 (using its transceiver control module 61421 is responsible for handling (generating/sending/receiving) signalling between the DU 61 and other nodes or units, such as the RU 60 and other nodes and units.

The DU 61 may support the Non-Public Network (NPN), The NPN may be a Stand-alone Non-Public Network (SNPN) or a Public Network Integrated NPN (PNI-NPN).

As described above, the RU 60 can be integrated/combined with the DU 61 or CU 62 as an integrated/combined unit. Any functionality in the description for DU 61 can be implemented in one of the integrated/combined unit above.

<Centralized Unit (CU)>

Figure 12:
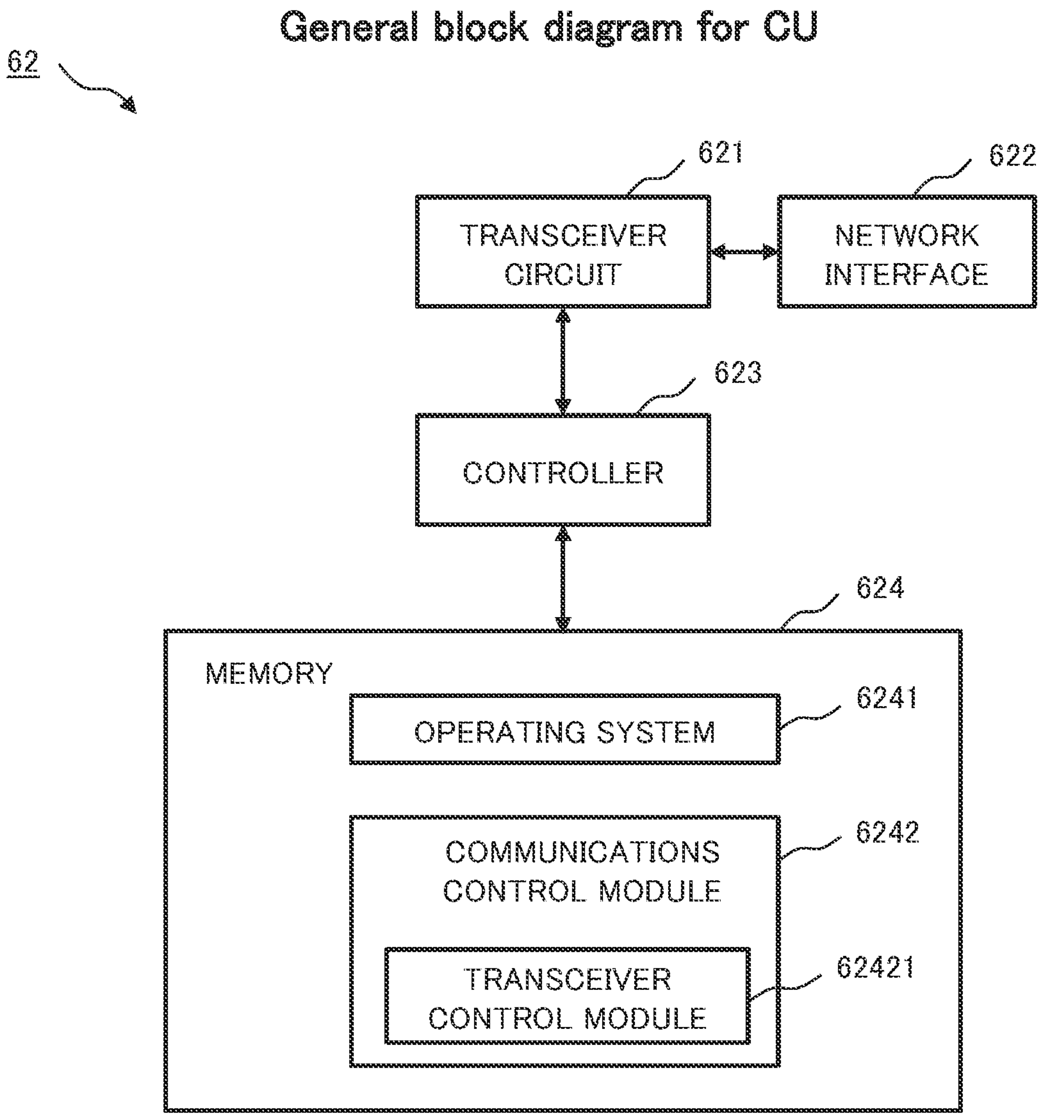
FIG. 12 is a block diagram for a Centralized Unit (CU).

FIG. 12 is a block diagram illustrating the main components of an exemplary CU 62, for example a CU part of base station ('eNB' in LTE, 'gNB' in 5G, a base station for 5G beyond, a base station for 6G). As shown, the apparatus includes a transceiver circuit 621 which is operable to transmit signals to and to receive signals from other nodes or units (including the DU 61) via a network interface 622. A controller 623 controls the operation of the CU 62 in accordance with software stored in a memory 624. Software may be pre-installed in the memory 624 and/or may be downloaded via the telecommunication network or from a removable data storage device (RMD), for example. The software includes, among other things, an operating system 6241 and a communications control module 6242 having at least a transceiver control module 62421. The communications control module 6242 (using its transceiver control module 62421 is responsible for handling (generating/sending/receiving) signalling between the CU 62 and other nodes or units, such as the DU 61 and other nodes and units.

The CU 62 may support the Non-Public Network (NPN), The NPN may be a Stand-alone Non-Public Network (SNPN) or a Public Network Integrated NPN (PNI-NPN).

As described above, the CU 62 can be integrated/combined with the DU 61 as an integrated/combined unit. Any functionality in the description for the CU 62 can be implemented in the integrated/combined unit above.

<AMF>

Figure 13:
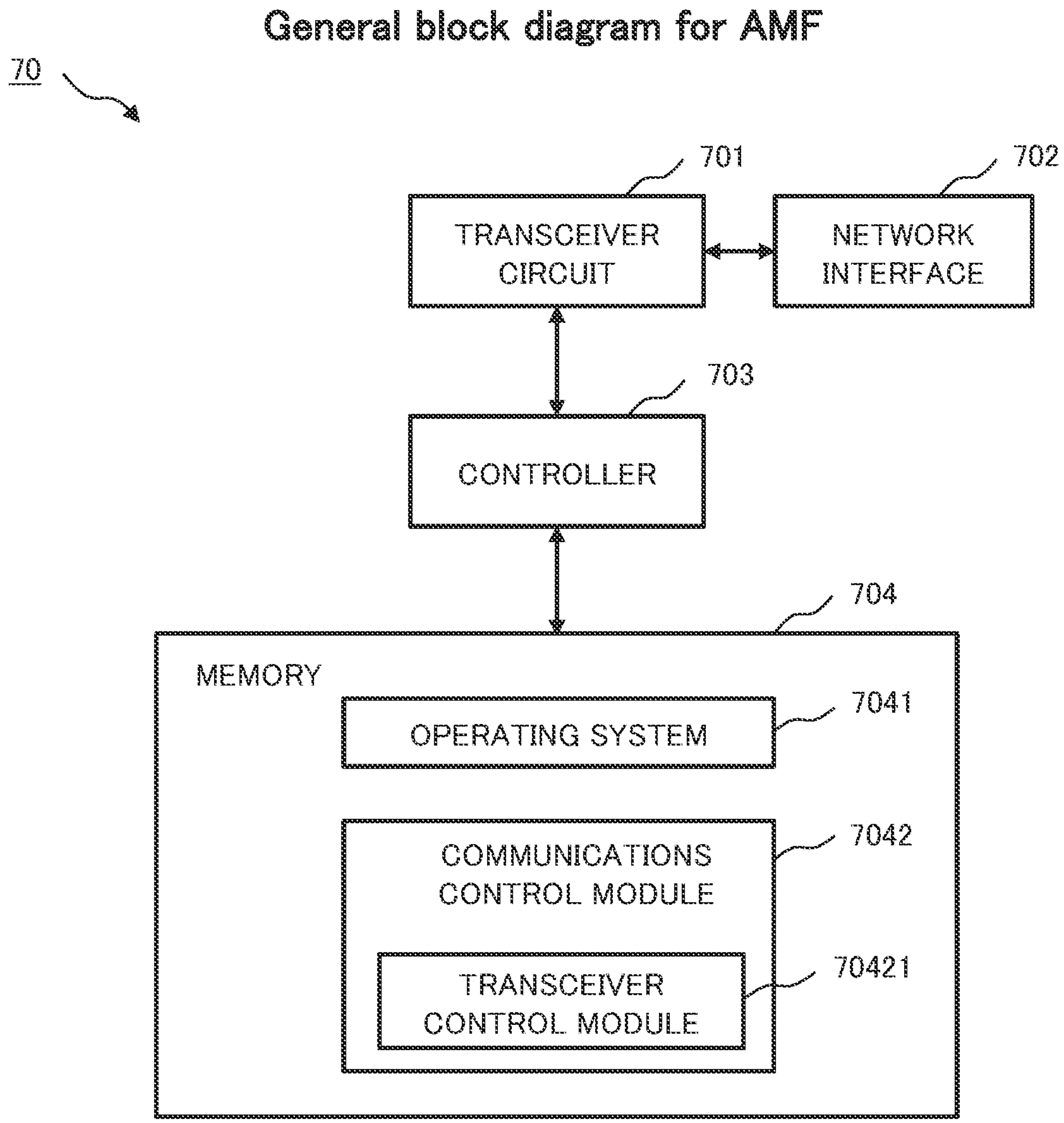
FIG. 13 is a block diagram for an AMF.

FIG. 13 is a block diagram illustrating the main components of the AMF 70. As shown, the apparatus includes a transceiver circuit 701 which is operable to transmit signals to and to receive signals from other nodes (including the UE 3) via a network interface 702. A controller 703 controls the operation of the AMF 70 in accordance with software stored in a memory 704. Software may be pre-installed in the memory 704 and/or may be downloaded via the telecommunication network or from a removable data storage device (RMD), for example. The software includes, among other things, an operating system 7041 and a communications control module 7042 having at least a transceiver control module 70421. The communications control module 7042 (using its transceiver control module 70421 is responsible for handling (generating/sending/receiving) signalling between the AMF 70 and other nodes, such as the UE 3 (e.g. via the (R) AN node 5) and other core network nodes (including core network nodes in the HPLMN of the UE 3 when the UE 3 is roaming-in. Such signalling may include, for example, appropriately formatted signalling messages (e.g. a registration request message and associated response messages) relating to access and mobility management procedures (for the UE 3).

The AMF 70 may support the Non-Public Network (NPN), The NPN may be a Stand-alone Non-Public Network (SNPN) or a Public Network Integrated NPN (PNI-NPN).

<SMF>

Figure 14:
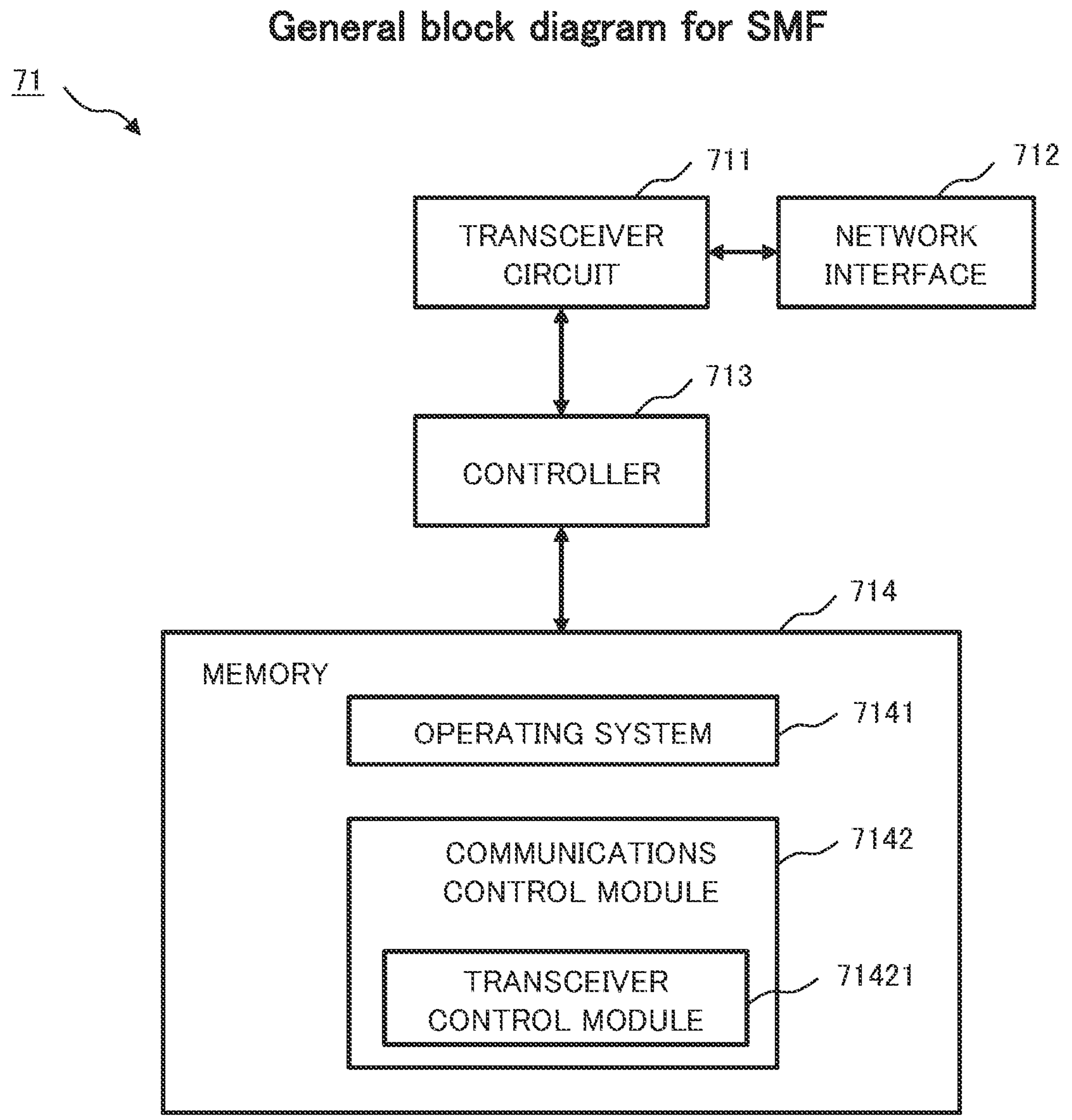
FIG. 14 is a block diagram for an SMF.

FIG. 14 is a block diagram illustrating the main components of the SMF 71. As shown, the apparatus includes a transceiver circuit 711 which is operable to transmit signals to and to receive signals from other nodes (including the AMF 70) via a network interface 712. A controller 713 controls the operation of the SMF 71 in accordance with software stored in a memory 714. Software may be pre-installed in the memory 714 and/or may be downloaded via the telecommunication network or from a removable memory device (RMD), for example. The software includes, among other things, an operating system 7141 and a communications control module 7142 having at least a transceiver control module 71421. The communications control module 7142 (using its transceiver control module 71421 is responsible for handling (generating/sending/receiving) signalling between the SMF 71 and other nodes, such as the UPF 72 and other core network nodes (including core network nodes in the HPLMN of the UE 3 when the UE 3 is roaming-in. Such signalling may include, for example, appropriately formatted signalling messages (e.g. a Hypertext Transfer Protocol (HTTP) restful methods based on the service based interfaces) relating to session management procedures (for the UE 3).

The SMF 71 may support the Non-Public Network (NPN), The NPN may be a Stand-alone Non-Public Network (SNPN) or a Public Network Integrated NPN (PNI-NPN).

Note that SMF+PGW-C (or SMF/PGW-C) may have same components to the SMF 71. In addition, the SMF+PGW-C (or the SMF/PGW-C) has function of the SMF 71 and function of the PGW-C. The function of the PGW-C can be achieved by the components of the SMF+PGW-C (or the SMF/PGW-C).

<UDM>

Figure 15:
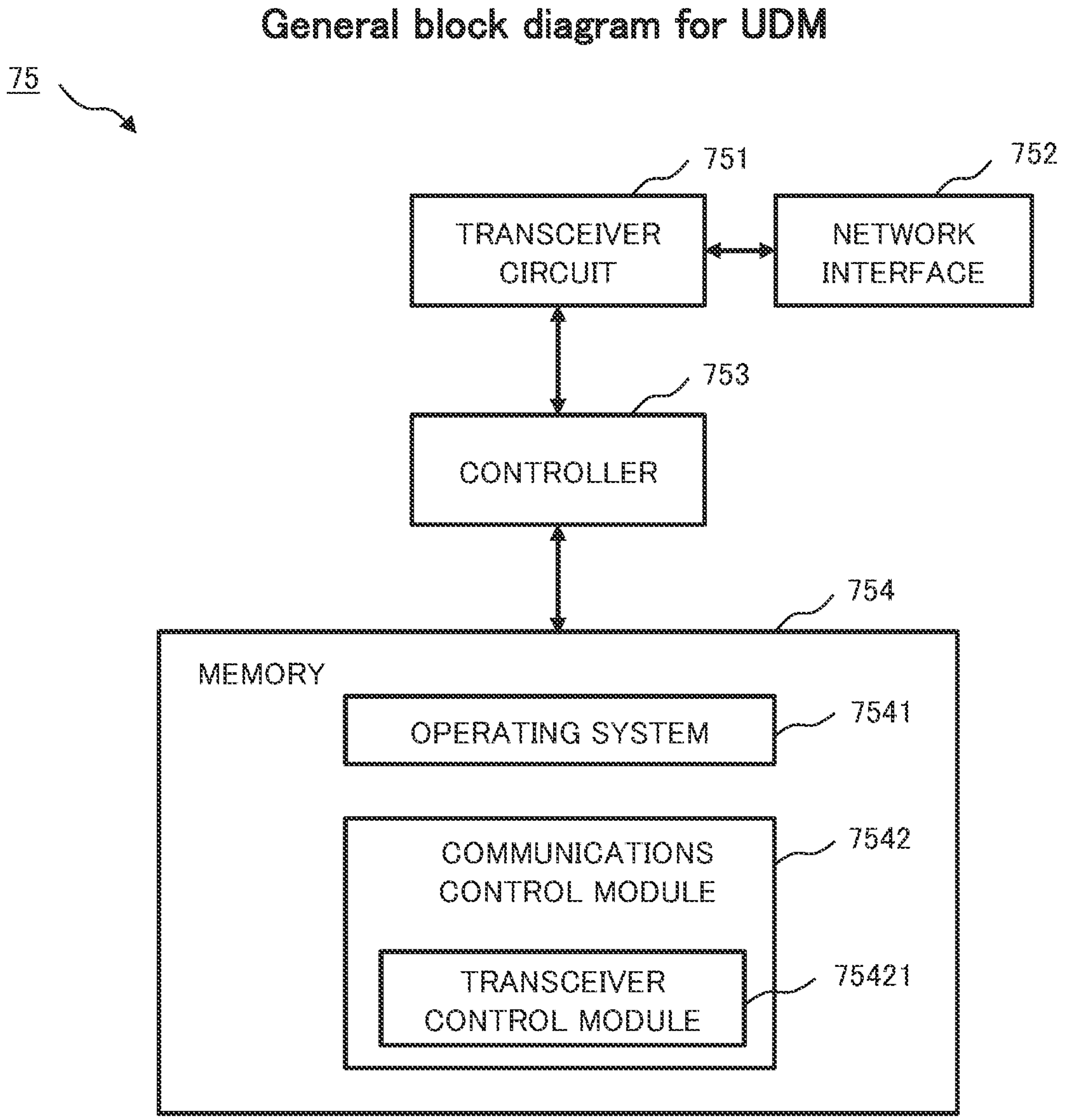
FIG. 15 is a block diagram for a UDM.

FIG. 15 is a block diagram illustrating the main components of the UDM 75. As shown, the apparatus includes a transceiver circuit 751 which is operable to transmit signals to and to receive signals from other nodes (including the AMF 70) via a network interface 752. A controller 753 controls the operation of the UDM 75 in accordance with software stored in a memory 754. Software may be pre-installed in the memory 754 and/or may be downloaded via the telecommunication network or from a removable data storage device (RMD), for example. The software includes, among other things, an operating system 7541 and a communications control module 7542 having at least a transceiver control module 75421. The communications control module 7542 (using its transceiver control module 75421 is responsible for handling (generating/sending/receiving) signalling between the UDM 75 and other nodes, such as the AMF 70 and other core network nodes (including core network nodes in the VPLMN of the UE 3 when the UE 3 is roaming-out. Such signalling may include, for example, appropriately formatted signalling messages (e.g. a HTTP restful methods based on the service based interfaces) relating to mobility management procedures (for the UE 3).

The UDM 75 may support the Non-Public Network (NPN), The NPN may be a Stand-alone Non-Public Network (SNPN) or a Public Network Integrated NPN (PNI-NPN).

<NSACF>

Figure 16:
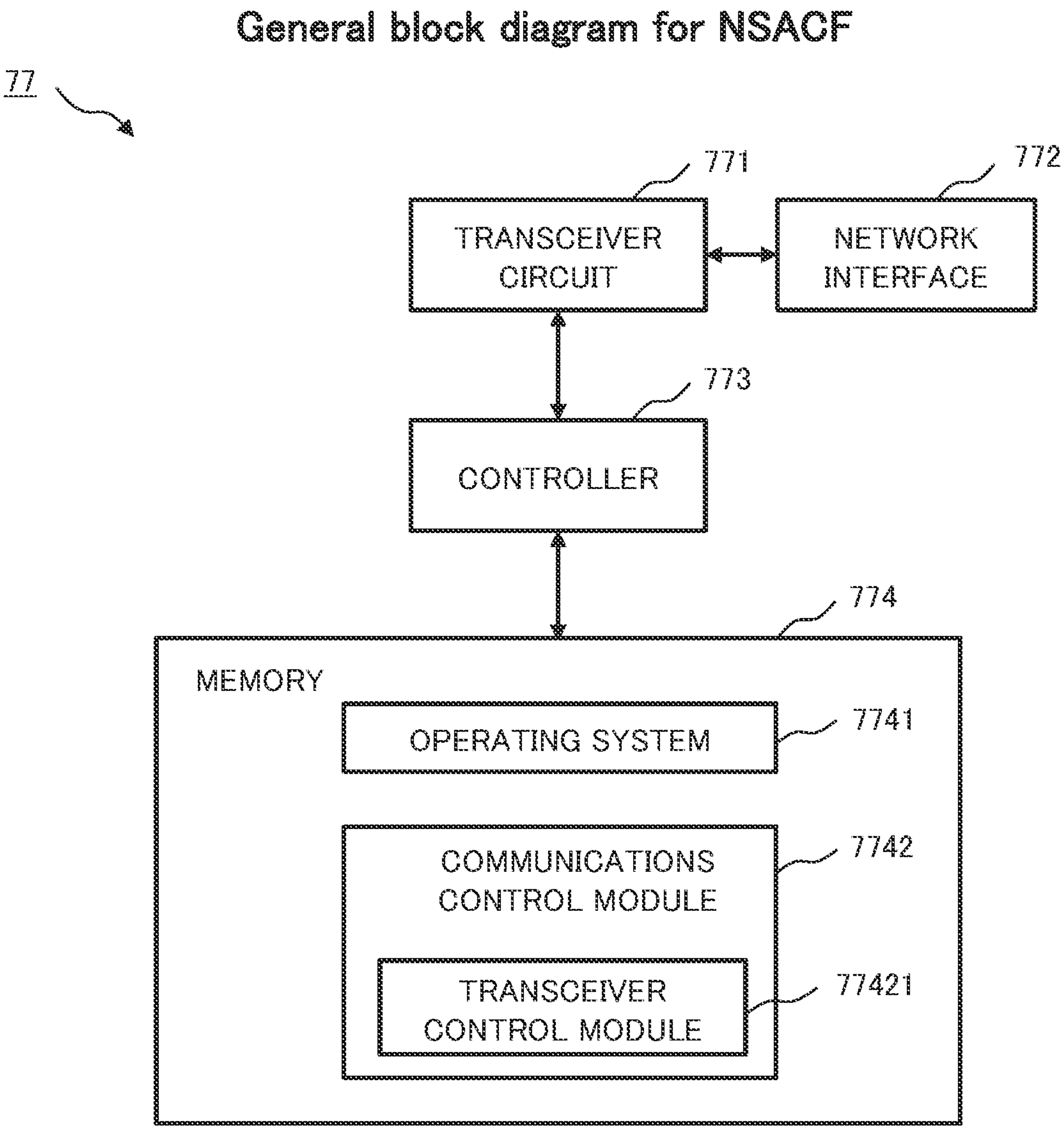
FIG. 16 illustrates Impacts to UE Requested PDN Connectivity Procedure.

FIG. 16 is a block diagram illustrating the main components of the NSACF 77. As shown, the apparatus includes a transceiver circuit 771 which is operable to transmit signals to and to receive signals from other nodes (including the AMF 70, SMF 71 and SMF+PGW-C) via a network interface 772. A controller 773 controls the operation of the NSACF 77 in accordance with the software stored in a memory 774. The Software may be pre-installed in the memory 774 and/or may be downloaded via the telecommunication network or from a removable data storage device (RMD), for example. The software includes, among other things, an operating system 7741 and a communications control module 7742 having at least a transceiver control module 77421. The communications control module 7742 (using its transceiver control module 77421 is responsible for handling (generating/sending/receiving) signalling between the NSACF 77 and other nodes, such as the AMF 70 and other core network nodes (including core network nodes in the HPLMN of the UE 3 when the UE 3 is roaming-in. Such signalling may include, for example, appropriately formatted signalling messages (e.g. a HTTP restful methods based on the service based interfaces) relating to network data analytics function procedures (for the UE 3). The NSACF 77 may support the Non-Public Network (NPN), The NPN may be a Stand-alone Non-Public Network (SNPN) or a Public Network Integrated NPN (PNI-NPN).

<Modifications and Alternatives>

Detailed aspects have been described above. As those skilled in the art will appreciate, a number of modifications and alternatives can be made to the above aspects whilst still benefiting from the disclosures embodied therein. By way of illustration only a number of these alternatives and modifications will now be described.

In the above description, the UE 3 and the network apparatus are described for ease of understanding as having a number of discrete modules (such as the communication control modules). Whilst these modules may be provided in this way for certain applications, for example where an existing system has been modified to implement the disclosure, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above aspects, a number of software modules were described. As those skilled in the art will appreciate, the software modules may be provided in compiled or un-compiled form and may be supplied to the UE 3 and the network apparatus as a signal over a computer network, or on a recording medium. Further, the functionality performed by part or all of this software may be performed using one or more dedicated hardware circuits. However, the use of software modules is preferred as it facilitates the updating of the UE 3 and the network apparatus in order to update their functionalities.

In the above aspects, a 3GPP radio communications (radio access) technology is used. However, any other radio communications technology (e.g. WLAN, Wi-Fi, WiMAX, Bluetooth, etc.) and other fix line communications technology (e.g. BBF Access, Cable Access, optical access, etc.) may also be used in accordance with the above aspects.

Items of user equipment might include, for example, communication devices such as mobile telephones, smartphones, user equipment, personal digital assistants, laptop/tablet computers, web browsers, e-book readers and/or the like. Such mobile (or even generally stationary) devices are typically operated by a user, although it is also possible to connect so-called 'Internet of Things' (IoT) devices and similar machine-type communication (MTC) devices to the network. For simplicity, the present application refers to mobile devices (or UEs) in the description but it will be appreciated that the technology described can be implemented on any communication devices (mobile and/or generally stationary) that can connect to a communications network for sending/receiving data, regardless of whether such communication devices are controlled by human input or software instructions stored in memory.

Various other modifications will be apparent to those skilled in the art and will not be described in further detail here.

The whole or part of the example Aspects disclosed above can be described as, but not limited to, the following.

<5.15.11.5 Support of Network Slice Admission Control and Interworking with EPC>

If EPS counting is required for a network slice, the Network Slice Admission Control for maximum number of UEs and/or for maximum number of PDU Sessions per network slice is performed at the time of PDN connection establishment in case of EPC interworking. To support the NSAC for maximum number of UEs and/or for maximum number of PDU Sessions per network slice in EPC, the SMF+PGW-C is configured with the information indicating which network slice is subject to NSAC. During PDN connection establishment in EPC, the SMF+PGW-C selects an S-NSSAI associated with the PDN connection as described in clause 5.15.7.1. If the selected S-NSSAI by the SMF+PGW-C is subject to the NSAC, the SMF+PGW-C triggers interaction with NSACF to check the availability of the network slice, before the SMF+PGW-C provides the selected S-NSSAI to the UE. If the network slice is available, the SMF+PGW-C continues to proceed with the PDN connection establishment procedure.

The NSACF performs the following for checking network slice availability prior to returning a response to the SMF+PGW-C:

If:

the UE identity is already included in the list of UE IDs registered with a network slice (if Network Slice Admission Control for maximum number of UEs is applicable) and the current number of PDU sessions is below the maximum number (if Network Slice Admission Control for maximum number of sessions is applicable); or the UE identity is not included in the list of UE IDs registered with a network slice and the current number of UE registration did not reach the maximum number (if Network Slice Admission Control for maximum number of UEs is applicable), and the current number of PDU sessions did not reach the maximum number (if Network Slice Admission Control for maximum number of sessions is applicable);

then the NSACF responds to the SMF+PGW-C with the information that the network slice is available. The NSACF includes the UE identity in the list of UE IDs if not already on the list and increases the current number of UE registration (if Network Slice Admission Control for maximum number of UEs is applicable) and increases the current number of PDU sessions (if Network Slice Admission Control for maximum number of sessions is applicable). If the NSACF returns that the S-NSSAI is not available, then the SMF+PGW-C may select another S-NSSAI which maps to the APN. If another S-NSSAI is also subject to NSAC then the SMG+PGW-C triggers interaction with NSACF to check the availability of the network slice. When the NSACF indicates the selected S-NSSAI is available, the SMF+PGW-C associate the selected S-NSSAI with the PDN connection.

When the UE with ongoing PDN connection(s) moves from EPC to 5GC, the SMF+PGW-C triggers a request to decrease the number of the UE registration in NSACF and the AMF triggers a request to increase the number of the UE registration in NSACF when the UE is registered in the new AMF. If there are more than one PDN connections associated with the S-NSSAI, the NSACF may receive multiple requests for the same S-NSSAI from different SMF+PGW-Cs. When the UE with ongoing PDU session(s) moves from 5GC to EPC, the SMF+PGW-C triggers a request to increase the number of the UE registration in NSACF and the old AMF triggers a request to decrease the number of the UE registration in NSACF when the UE is deregistered in old AMF. If there are more than one PDU sessions associated with the S-NSSAI, the NSACF may receive multiple requests for the same S-NSSAI from different SMF+PGW-Cs. The NSACF maintains a list of UE IDs based on the requests from SMF+PGW-C(s) and AMF, and adjusts the current number of registrations accordingly.

When the UE with ongoing PDN connection(s) moves from EPC to 5GC, or from 5GC to EPC, the session continuity is guaranteed as the admission was granted at the time of PDN connection establishment, i.e. the number of PDU session is not counted again in 5GC.

Editor's note: NSAC mechanism during the mobility between EPC and 5GC can be revisited to make it align with 5GC mechanism, i.e. mobility between AMFs.

If the PDN connection associated with S-NSSAI is released in EPC or the N1 mode is disabled or the Core Network Type Restriction disallows the UE to access 5GC, the SMF+PGW-C triggers a request (i.e. decrease) to NSACF for maximum number of PDU sessions per network slice control. The NSACF determines to decrease the current number of registrations and remove the UE identity from the list of UE IDs if the PDN connection(s) associated with S-NSSAI are all released in EPC.

Editor's note: It is FFS whether one NSACF is in charge of registration and session admission control, or there are respective NSCAFs for registration and session admission control, depending on the deployment scenarios.

NOTE: Network Slice Admission Control in EPC is not performed for the attachment without PDN connectivity.

If EPS counting is not required for a network slice, the Network Slice Admission Control for maximum number of UEs and/or for maximum number of PDU Sessions per network slice is performed when the UE moves from EPC to 5GC, i.e. when the UE performs mobility Registration procedure from EPC to 5GC (Network Slice Admission Control for maximum number of UEs per network slice) and/or when the PDN connections are handed over from EPC to 5GC (Network Slice Admission Control for maximum number of PDU Sessions per network slice). The SMF+PGW-C is configured with the information indicating the network slice is subject to NSAC only in 5GS. The PDN connection interworking procedure is performed as described in clause 5.15.7.1.

Editor's note: It is FFS whether and how to support session continuity if either the current number of UE registration or the current number of PDU sessions reaches the maximum number when the UE moves from EPC to 5GC.

<4.11.1.5.4.1 PDN Connection Request>

The UE Requested PDN Connectivity Procedure specified in clause 5.10.2 of TS 23.401 is impacted as shown in in FIG. 4.11.1.5.4.1-1 when interworking with 5GS is supported.

Figure 17:
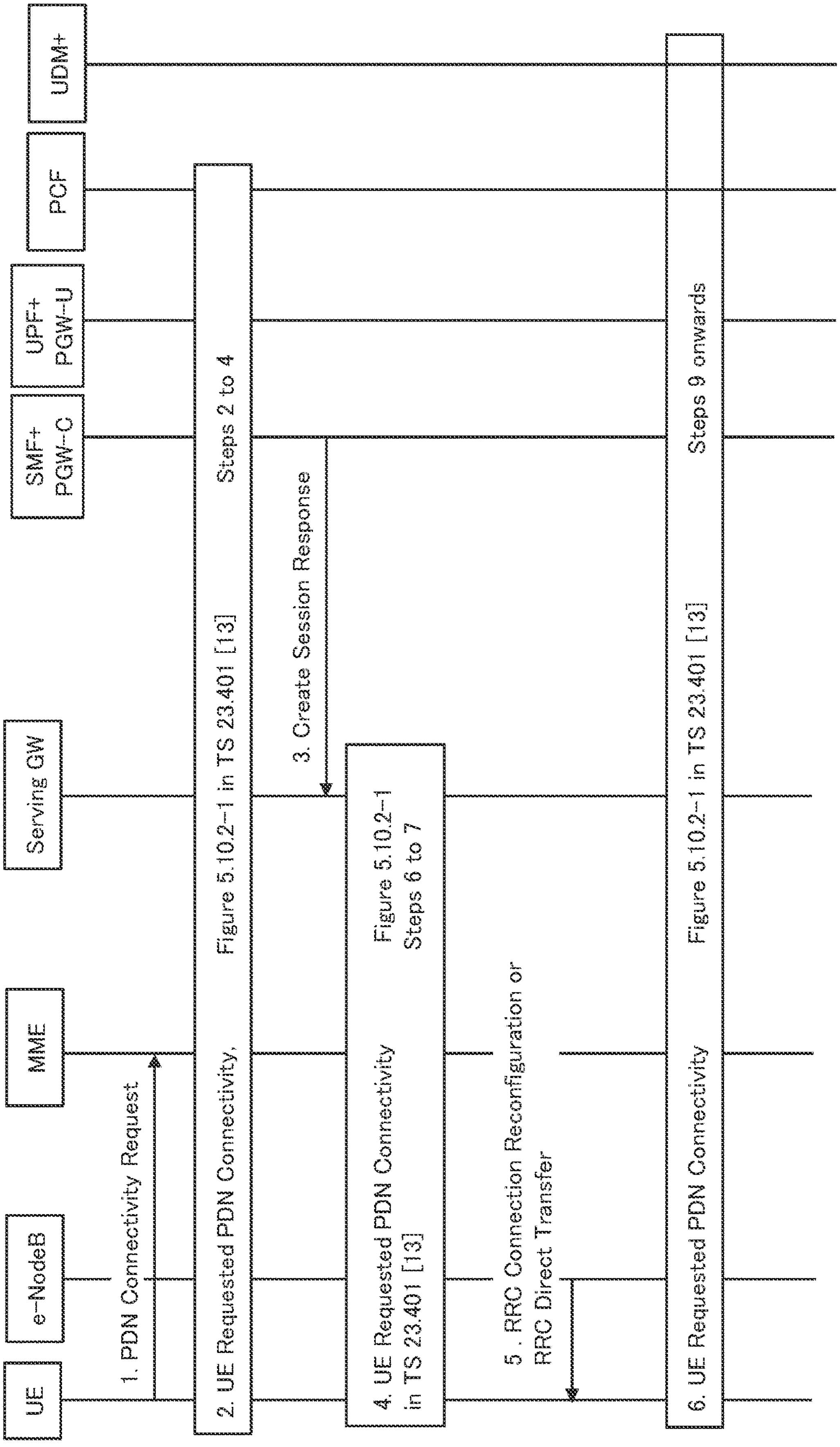
FIG. 17 is a block diagram for a Network Slice Selection Function (NSSF).

FIG. 4.11.1.5.4.1-1: Impacts to UE Requested PDN Connectivity Procedure (See FIG. 17)

1. UE sends a PDN connectivity Request to the MME as specified in Step 1 in clause 5.10.2 of TS 23.401 with the following modification:
   - If the UE is 5G NAS capable and the Request type is "initial request", the UE shall allocate a PDU Session ID and include it in the PCO. The PDU Session ID shall be unique across all other PDN connections of the UE.
2. The relevant steps of the procedure as specified in the figure above are executed. In step 4 of TS 23.401 [13], IP Session Establishment/Modification procedure is replaced by SM Policy Association Establishment/Modification procedure as specified in clauses 4.16.4 and 4.16.5. Upon reception of the create session request message for an APN, the SMF+PGW-C determines the associated S-NSSAI of the APN. If the S-NSSAI is already registered with the NSCAF for the UE counting of the S-NSSAI, then the SMF+PGW-C sends Nnsacf_NumberOfPDUsPerSliceAvailabilityCheckAndUpdate_Request message with Update flag set to increment to the NSCAF, otherwise the SMF+PGW-C sends Nnsacf_NumberOfUEsPerSliceAvailabilityCheckAndUpdate_Request with update flag set to increase. Upon the SMF+PGW-C receives the Nnsacf_NumberOfUEsPerSliceAvailabilityCheckAndUpdate_Response message indicating successful operation procedure, the SMF+PGW-C stores the S-NSSA is successfully registered in the NSACF and sends Nnsacf_NumberOfPDUsPerSliceAvailabilityCheckAndUpdate_Request message with Update flag set to increment to the NSCAF. In case the number of PDU session for the S-NSSAI has already been reached the maximum threshold for the S-NSSAI, the NSCAF returns message indicating the operation is not successful, in this case, the PDN connection establishment procedure fails and the NSACF sends Nnsacf_NumberOfUEsPerSliceAvailabilityCheckAndUpdate_Request message with update flag set to decrease.

The Nnsacf_NumberOfUEsPerSliceAvailabilityCheckAndUpdate_Request message or Nnsacf_NumberOfPDUsPerSliceAvailabilityCheckAndUpdate_Request message may contain APN of the PDN connection or the current location of the UE (e.g. current Tracking Area identity). NSACF stores the APN for the UE ID in its database. It also stores the UE current location. The MME sends the current location to the S-GW in Create Session Request message or in an existing message between the MME and S-GW. The S-GW forwards the current location to the SMF+PGW-C. The current location may also be sent by SMF+PGW-C to NRF which will use current location to determine the NSCAF for the number of UE counting or number of PDU session counting.

3. Step 6 as specified in clause 5.10.2 of TS 23.401 is executed with the following modification:
   - If the SMF+PGW-C accepts to provide interworking of the PDN connection with 5GC, the SMF+PGW-C shall allocate 5G QoS parameters corresponding to PDN connection, e.g. Session AMBR, QoS rules and QoS Flow level QoS parameters if needed for the QoS Flow(s) associated with the QoS rule(s) and then include them in PCO.
   - If the SMF+PGW-C accepts to provide interworking of the PDN connection with 5GC, the SMF+PGW-C shall determine the S-NSSAI associated with the PDN connection based on the operator policy, and send the S-NSSAI together with the PLMN ID to the UE in the PCO.
   - If the SMF+PGW-C accepts to provide interworking of the PDN connection with 5GC the SMF+PGW-C, if Small Data Rate Control is used, provides the Small Data Rate Control parameters to the UE in the PCO.
4. The relevant steps of the procedure as specified in the figure above are executed.
5. Step 8 as specified in clause 5.10.2 of TS 23.401 with the following modification:
   - If 5G QoS parameters are included in the PCO, the UE shall store them. If 5G QoS parameters are not included in the PCO, the UE shall note that session continuity for this PDN connection on mobility to 5G is not provided by the network.
   - If the S-NSSAI and the PLMN ID associated with the PDN connection are included in the PCO, the UE shall store them.
   - If the Small Data Rate Control parameters are included in the PCO, the UE shall store them.
6. The relevant steps of the procedure as specified in the figure above are executed.

While the disclosure has been particularly shown and described with reference to exemplary Aspects thereof, the disclosure is not limited to these Aspects. It will be understood by those of ordinary skill in the art that various changes in form and details may be made therein without departing from the spirit and scope of the present disclosure as defined by this document. For example, the Aspects above are not limited to 5GS or EPS, and the Aspects are also applicable to communication system other than 5GS or EPS.

The whole or part of the example Aspects disclosed above can be described as, but not limited to, the following supplementary notes.

<First Supplementary Notes> supplementary note1. A method of a core network apparatus comprising:
- receiving, from Serving Gateway-C(SGW-C), a Create Session Request message,
- wherein the Create Session Request message includes information indicating Access Point Name (APN) and information indicating that N1 mode is supported by a User Equipment (UE);
- sending, to a Network Slice Admission Control Function (NSACF) apparatus, first Nnsacf_NumberOfUEsPerSliceAvailabilityCheckUpdate request in a case where the Create Session Request message includes the information indicating that N1 mode is supported by the UE,
- wherein the first Nnsacf_NumberOfUEsPerSliceAvailabilityCheckUpdate request includes Single Network Slice Selection Assistance Information (S-NSSAI) corresponding to the APN and information indicating to increase the number of UEs for a Network Slice Admission Control (NSAC);

receiving, from the NSACF apparatus, first Nnsacf_NumberOfUEsPerSliceAvailabilityCheckUpdate response, wherein the first Nnsacf_NumberOfUEsPerSliceAvailabilityCheckUpdate response includes information indicating that registration of the UE is allowed;

sending, to the NSACF apparatus, Nnsacf_NumberOfPDUsPerSliceAvailabilityCheckUpdate request in a case of receiving Nnsacf_NumberOfUEsPerSliceAvailabilityCheckUpdate response, wherein the Nnsacf_NumberOfPDUsPerSliceAvailabilityCheckUpdate request includes the S-NSSAI and information indicating to increase the number of Protocol Data Unit (PDU) sessions for the NSAC;

receiving, from the apparatus, NSACF Nnsacf_NumberOfPDUsPerSliceAvailabilityCheckUpdate response, wherein the Nnsacf_NumberOfPDUsPerSliceAvailabilityCheckUpdate response includes information indicating that the UE is not allowed to use the S-NSSAI;

sending, to the NSACF apparatus, second Nnsacf_NumberOfUEsPerSliceAvailabilityCheckUpdate request in a case of receiving the Nnsacf_NumberOfPDUsPerSliceAvailabilityCheckUpdate response, wherein the second Nnsacf_NumberOfUEsPerSliceAvailabilityCheckUpdate request includes the S-NSSAI and information indicating to decrease the number of UEs for the NSAC;

receiving, from the NSACF apparatus, second Nnsacf_NumberOfUEsPerSliceAvailabilityCheckUpdate response, wherein the second Nnsacf_NumberOfUEsPerSliceAvailabilityCheckUpdate response includes information indicating that decrement of the number of UEs for the NSAC is successfully completed; and sending, to the UE via the SGW-C and Mobility Management Entity (MME), a value of a timer to suppress procedure related to the APN in a case of receiving the second Nnsacf_NumberOfUEsPerSliceAvailabilityCheckUpdate response.

supplementary note2. A method of a User Equipment (UE) comprising:

performing ATTACH procedure related to Access Point Name (APN) or UE requested PDN connectivity procedure related to the APN;

receiving, from a core network apparatus, a value of a timer to suppress procedure related to the APN in a case where the number of UEs for Network Slice Admission Control (NSAC) is increased and establishment of Protocol Data Unit (PDU) session related to Single Network Slice Selection Assistance Information (S-NSSAI) corresponding to the APN is not allowed by the NSAC and the number of UEs is decreased; and retaining the procedure related to the APN while the timer runs.

supplementary note3. A method of a core network apparatus comprising:

receiving, from Serving Gateway-C(SGW-C), a first Create Session Request message, wherein the first Create Session Request message includes information indicating Access Point Name (APN) and a list including a pair of Single Network Slice Selection Assistance Information (S-NSSAI) that Network Slice Admission Control (NSAC) is completed and the APN corresponding to the S-NSSAI;

determining, based on the list, whether the S-NSSAI corresponding to the received APN is associated with another APN which is different from the received APN;

sending, to a Network Slice Admission Control Function (NSACF) apparatus, first Nnsacf_NumberOfUEsPerSliceAvailabilityCheckUpdate request in a case of determining that the S-NSSAI corresponding to the received APN is associated with the another APN which is different from the received APN, wherein the first Nnsacf_NumberOfUEsPerSliceAvailabilityCheckUpdate request includes the S-NSSAI corresponding to the received APN and information indicating to increase the number of User Equipments (UEs) for the NSAC;

receiving, from the NSACF apparatus, first Nnsacf_NumberOfUEsPerSliceAvailabilityCheckUpdate response, wherein the first Nnsacf_NumberOfUEsPerSliceAvailabilityCheckUpdate response includes information indicating that registration of the UE is allowed;

sending, to the NSACF apparatus, first Nnsacf_NumberOfPDUsPerSliceAvailabilityCheckUpdate request in a case of receiving the first Nnsacf_NumberOfUEsPerSliceAvailabilityCheckUpdate response, wherein the first Nnsacf_NumberOfPDUsPerSliceAvailabilityCheckUpdate request includes the S-NSSAI and information indicating to increase the number of Protocol Data Unit (PDU) sessions for the NSAC;

receiving, from the NSACF apparatus, first Nnsacf_NumberOfPDUsPerSliceAvailabilityCheckUpdate response, wherein the first Nnsacf_NumberOfPDUsPerSliceAvailabilityCheckUpdate response includes information indicating that a User Equipment (UE) is allowed to use the S-NSSAI; and sending, to the SGW-C, a message including the S-NSSAI and information indicating that the S-NSSAI is registered to the NSACF apparatus.

supplementary note4. The method according to supplementary note 3, further comprising:

receiving, from the SGW-C, information indicating that N1 mode is not supported by the UE;

sending, to the NSACF apparatus, second Nnsacf_NumberOfUEsPerSliceAvailabilityCheckUpdate request in a case of receiving the information indicating that N1 mode is not supported by the UE, wherein the second Nnsacf_NumberOfUEsPerSliceAvailabilityCheckUpdate request includes the S-NSSAI and information indicating to decrease the number of UEs for the NSAC;

receiving, from the NSACF apparatus, second Nnsacf_NumberOfUEsPerSliceAvailabilityCheckUpdate response, wherein the second Nnsacf_NumberOfUEsPerSliceAvailabilityCheckUpdate response includes information indicating that decrement of the number of UEs for the NSAC is successfully completed;

sending, to the NSACF apparatus, second Nnsacf_NumberOfPDUsPerSliceAvailabilityCheckUpdate request in a case of receiving the second Nnsacf_NumberOfUEsPerSliceAvailabilityCheckUpdate response, wherein the second Nnsacf_NumberOfPDUsPerSliceAvailabilityCheckUpdate request includes the S-NSSAI and information indicating to decrease the number of PDU sessions for the NSAC;

receiving, from the NSACF apparatus, second Nnsacf_NumberOfPDUsPerSliceAvailabilityCheckUpdate response, wherein the second Nnsacf_NumberOfPDUsPerSliceAvailabilityCheckUpdate response includes information indicating that decrement of the number of PDU sessions for the NSAC is successfully completed; and sending, to Mobility Management Entity (MME) via the SGW-C, information indicating that network slice associated with the APN is not subject to the NSAC in a case of receiving the second Nnsacf_NumberOfPDUsPerSliceAvailabilityCheckUpdate response.

supplementary note5. The method according to supplementary note 3, further comprising:

receiving, from the SGW-C, a second Create Session Request message, wherein the second Create Session Request message includes information indicating another APN which is different from the APN received in the first Create Session Request message; and sending, to the NSACF apparatus, second Nnsacf_NumberOfPDUsPerSliceAvailabilityCheckUpdate request in a case of receiving the first Nnsacf_NumberOfUEsPerSliceAvailabilityCheckUpdate response, wherein the second Nnsacf_NumberOfPDUsPerSliceAvailabilityCheckUpdate request includes the S-NSSAI corresponding to the another APN and another information indicating to increase the number of PDU sessions for the NSAC.

supplementary note6. A core network apparatus comprising:

means for receiving, from Serving Gateway-C(SGW-C), a Create Session Request message, wherein the Create Session Request message includes information indicating Access Point Name (APN) and information indicating that N1 mode is supported by a User Equipment (UE);

means for sending, to a Network Slice Admission Control Function (NSACF) apparatus, first Nnsacf_NumberOfUEsPerSliceAvailabilityCheckUpdate request in a case where the Create Session Request message includes the information indicating that N1 mode is supported by the UE, wherein the first Nnsacf_NumberOfUEsPerSliceAvailabilityCheckUpdate request includes Single Network Slice Selection Assistance Information (S-NSSAI) corresponding to the APN and information indicating to increase the number of UEs for a Network Slice Admission Control (NSAC);

means for receiving, from the NSACF apparatus, first Nnsacf_NumberOfUEsPerSliceAvailabilityCheckUpdate response, wherein the first Nnsacf_NumberOfUEsPerSliceAvailabilityCheckUpdate response includes information indicating that registration of the UE is allowed;

means for sending, to the NSACF apparatus, Nnsacf_NumberOfPDUsPerSliceAvailabilityCheckUpdate request in a case of receiving Nnsacf_NumberOfUEsPerSliceAvailabilityCheckUpdate response, wherein the Nnsacf_NumberOfPDUsPerSliceAvailabilityCheckUpdate request includes the S-NSSAI and information indicating to increase the number of Protocol Data Unit (PDU) sessions for the NSAC;

means for receiving, from the NSACF apparatus, Nnsacf_NumberOfPDUsPerSliceAvailabilityCheckUpdate response, wherein the Nnsacf_NumberOfPDUsPerSliceAvailabilityCheckUpdate response includes information indicating that the UE is not allowed to use the S-NSSAI;

means for sending, to the NSACF apparatus, second Nnsacf_NumberOfUEsPerSliceAvailabilityCheckUpdate request in a case of receiving the Nnsacf_NumberOfPDUsPerSliceAvailabilityCheckUpdate response, wherein the second Nnsacf_NumberOfUEsPerSliceAvailabilityCheckUpdate request includes the S-NSSAI and information indicating to decrease the number of UEs for the NSAC;

means for receiving, from the NSACF apparatus, second Nnsacf_NumberOfUEsPerSliceAvailabilityCheckUpdate response, wherein the second Nnsacf_NumberOfUEsPerSliceAvailabilityCheckUpdate response includes information indicating that decrement of the number of UEs for the NSAC is successfully completed; and means for sending, to the UE via the SGW-C and Mobility Management Entity (MME), a value of a timer to suppress procedure related to the APN in a case of receiving the second Nnsacf_NumberOfUEsPerSliceAvailabilityCheckUpdate response.

supplementary note7. A User Equipment (UE) comprising:

means for performing ATTACH procedure related to Access Point Name (APN) or UE requested PDN connectivity procedure related to the APN;

means for receiving, from a core network apparatus, a value of a timer to suppress procedure related to the APN in a case where the number of UEs for Network Slice Admission Control (NSAC) is increased and establishment of Protocol Data Unit (PDU) session related to Single Network Slice Selection Assistance Information (S-NSSAI) corresponding to the APN is not allowed by the NSAC and the number of UEs is decreased; and means for retaining the procedure related to the APN while the timer runs.

supplementary note8. A core network apparatus comprising:

means for receiving, from Serving Gateway-C(SGW-C), a first Create Session Request message, wherein the first Create Session Request message includes information indicating Access Point Name (APN) and a list including a pair of Single Network Slice Selection Assistance Information (S-NSSAI) that Network Slice Admission Control (NSAC) is completed and the APN corresponding to the S-NSSAI;

means for determining, based on the list, whether the S-NSSAI corresponding to the received APN is associated with another APN which is different from the received APN;

means for sending, to a Network Slice Admission Control Function (NSACF) apparatus, first Nnsacf_NumberOfUEsPerSliceAvailabilityCheckUpdate request in a case of determining that the S-NSSAI corresponding to the received APN is associated with the another APN which is different from the received APN, wherein the first Nnsacf_NumberOfUEsPerSliceAvailabilityCheckUpdate request includes the S-NSSAI corresponding to the received APN and information indicating to increase the number of User Equipments (UEs) for the NSAC;

means for receiving, from the NSACF apparatus, first Nnsacf_NumberOfUEsPerSliceAvailabilityCheckUpdate response, wherein the first Nnsacf_NumberOfUEsPerSliceAvailabilityCheckUpdate response includes information indicating that registration of the UE is allowed;

means for sending, to the NSACF apparatus, first Nnsacf_NumberOfPDUsPerSliceAvailabilityCheckUpdate request in a case of receiving the first Nnsacf_NumberOfUEsPerSliceAvailabilityCheckUpdate response, wherein the first Nnsacf_NumberOfPDUsPerSliceAvailabilityCheckUpdate request includes the S-NSSAI and information indicating to increase the number of Protocol Data Unit (PDU) sessions for the NSAC;

means for receiving, from the NSACF apparatus, first Nnsacf_NumberOfPDUsPerSliceAvailabilityCheckUpdate response, wherein the first Nnsacf_NumberOfPDUsPerSliceAvailabilityCheckUpdate response includes information indicating that a User Equipment (UE) is allowed to use the S-NSSAI; and means for sending, to the SGW-C, a message including the S-NSSAI and information indicating that the S-NSSAI is registered to the NSACF apparatus.

supplementary note9. The core network apparatus according to supplementary note 8, further comprising:

means for receiving, from the SGW-C, information indicating that N1 mode is not supported by the UE;

means for sending, to the NSACF apparatus, second Nnsacf_NumberOfUEsPerSliceAvailabilityCheckUpdate request in a case of receiving the information indicating that N1 mode is not supported by the UE, wherein the second Nnsacf_NumberOfUEsPerSliceAvailabilityCheckUpdate request includes the S-NSSAI and information indicating to decrease the number of UEs for the NSAC;

means for receiving, from the NSACF apparatus, second Nnsacf_NumberOfUEsPerSliceAvailabilityCheckUpdate response, wherein the second Nnsacf_NumberOfUEsPerSliceAvailabilityCheckUpdate response includes information indicating that decrement of the number of UEs for the NSAC is successfully completed;

means for sending, to the NSACF apparatus, second Nnsacf_NumberOfPDUsPerSliceAvailabilityCheckUpdate request in a case of receiving the second Nnsacf_NumberOfUEsPerSliceAvailabilityCheckUpdate response, wherein the second Nnsacf_NumberOfPDUsPerSliceAvailabilityCheckUpdate request includes the S-NSSAI and information indicating to decrease the number of PDU sessions for the NSAC;

means for receiving, from the NSACF apparatus, second Nnsacf_NumberOfPDUsPerSliceAvailabilityCheckUpdate response, wherein the second Nnsacf_NumberOfPDUsPerSliceAvailabilityCheckUpdate response includes information indicating that decrement of the number of PDU sessions for the NSAC is successfully completed; and means for sending, to Mobility Management Entity (MME) via the SGW-C, information indicating that network slice associated with the APN is not subject to the NSAC in a case of receiving the second Nnsacf_NumberOfPDUsPerSliceAvailabilityCheckUpdate response.

supplementary note10. The core network apparatus according to supplementary note 8, further comprising:

means for receiving, from the SGW-C, a second Create Session Request message, wherein the second Create Session Request message includes information indicating another APN which is different from the APN received in the first Create Session Request message; and means for sending, to the NSACF apparatus, second Nnsacf_NumberOfPDUsPerSliceAvailabilityCheckUpdate request in a case of receiving the first Nnsacf_NumberOfUEsPerSliceAvailabilityCheckUpdate response, wherein the second Nnsacf_NumberOfPDUsPerSliceAvailabilityCheckUpdate request includes the S-NSSAI corresponding to the another APN and another information indicating to increase the number of PDU sessions for the NSAC.

supplementary note 11. A method of a first core network apparatus comprising:

sending, to a second core network apparatus, first information to check availability of a communication apparatus related to a network slice;

receiving, from the second core network apparatus, a response message to the first information indicating that the communication apparatus successfully registered to the network slice;

sending, to the second core network apparatus, second information to check availability of Protocol Data Unit (PDU) session related to the network slice;

receiving, from the second core network apparatus, a response message to the second information indicating that the PDU session establishment error; and sending, to a third core network apparatus, third information indicating that Protocol Data Network (PDN) connection error.

supplementary note12. The method according to supplementary note 11, wherein the first core network apparatus comprising:

sending, to the second core network apparatus, fourth information to check availability of the communication apparatus related to the network slice; and receiving, from the second core network apparatus, a response message to the third information to decrease the number of PDU session for the network slice.

supplementary note13. A method of a first core network apparatus comprising:

receiving, from a third core network apparatus, fifth information indicating that a communication apparatus cannot be registered to a second network system which is different from a first network system;

sending, to a second core network apparatus, sixth information to decrease the number of the communication apparatus registered to a network slice;

receiving, from the second core network apparatus, a response message to the sixth information indicating that the number of the communication apparatus successfully decreased; and sending, to the third core network apparatus, a response message to the fifth information indicating that the second core network apparatus does not handle information related to the network slice.

supplementary note14. A method of a first core network apparatus comprising:

receiving, from a third core network apparatus fifth information indicating that a communication apparatus cannot be registered to a second network system which is different from a first network system;

sending, to a second core network apparatus, seventh information to decrease the number of the Protocol Data Unit (PDU) session registered to a network slice;

receiving, from the second core network apparatus, a response message to the seventh information indicating that the number of the PDU session successfully decreased; and sending, to the third core network apparatus, a response message to the fifth information indicating that the second core network apparatus does not handle information related to the network slice.

supplementary note15. A method of a first core network apparatus comprising:

receiving, from a third core network apparatus, fifth information indicating that a communication apparatus cannot be registered to a second network system which is different from a first network system;

sending, to a second core network apparatus, sixth information to decrease the number of the communication apparatus registered to a network slice;

receiving, from the second core network apparatus, a response message to the sixth information indicating that the number of the communication apparatus successfully decreased;

sending, to a second core network apparatus, seventh information to decrease the number of the Protocol Data Unit (PDU) session registered to the network slice, receiving, from the second core network apparatus, a response message to the seventh information indicating that the number of the PDU session successfully decreased; and sending, to the third core network apparatus, a response message to the fifth information indicating that the second core network apparatus does not handle information related to the network slice.

supplementary note16. A first core network apparatus comprising:

means for detecting Access Point Name (APN) for a communication apparatus;

means for receiving, from a third core network apparatus, a first request message to create a session for a second APN;

means for sending, to a second core network apparatus, a first update message to update the number of the communication apparatus registered to a network slice;

means for sending, to the second core network apparatus, a second update message to update the number of Protocol Data Unit (PDU) session registered to the network slice;

means for receiving, from the second core network apparatus, a response message to the second update message; and means for sending, to the third core network apparatus, a response message to the first request message, wherein the means for sending, to the second core network apparatus, a first update message does not send the first update message if the first core network apparatus detects the communication apparatus is registered to a first APN different from the second APN.

<Second Supplementary Notes>

Supplementary Note 1.

A core network node comprising:

means for requesting a network node for a network slice management to update the number of user equipment (UE) registered to the network slice;

means for requesting the network node for network slice management to update the number of Protocol Data Unit (PDU) sessions for a specific network slice; and means for receiving, information indicating failure related to the number of the PDU sessions update.

Supplementary Note 2.

The core network node according to supplementary note 1, further comprising means for invoking update information related to the number of the UE to decrease an UE count.

Supplementary Note 3.

The core network node according to supplementary note 2, wherein the means for invoking update invokes the update information related to the number of the UE to decrease the UE count based on the information indicating failure.

Supplementary Note 4.

The core network node according to any one of supplementary note 1 to 3, wherein the information indicating failure is received after requesting the network node for a network slice management to update the number of the UE and requesting the network node for network slice management to update the number of PDU sessions.

Supplementary Note 5.

The core network node according to any one of supplementary note 1 to 3, wherein the core network node is a combination of Session Management function node and PDN Gateway Control plane node (SMF+PGW-C).

Supplementary Note 6.

The core network node according to any one of supplementary note 1 to 3, wherein the network node for network slice management is a Network Slice Admission control function (NSACF).

Supplementary Note 7.

A network node for a network slice management comprising:

means for receiving a request, from a core network node, to update of the number of user equipment (UE) registered to the network slice;

means for receiving a request, from a core network node, to update the number of Protocol Data Unit (PDU) for a specific network slice; and means for sending, to a core network node, information indicating failure related to the number of PDU update.

Supplementary Note 8.

The network node for a network slice management according to supplementary note 7, wherein the information indicating failure is sent to the core network node to invoke update information related to the number of UE to decrease the UE count.

Supplementary Note 9.

The network node for a network slice management according to supplementary note 7 or 8, wherein the update information related to the number of UE to decrease the UE count is invoked based on the information indicating failure.

Supplementary Note 10.

The network node for a network slice management according to supplementary note 7 or 9, wherein the means for sending sends the information indicating failure after receiving the request to update of the number of UE and receiving the request to update the number of PDU.

Supplementary Note 11.

The network node for network slice management according to any one of supplementary note 7 to 10, wherein the core network node is a combination of Session Management function node and PDN Gateway Control plane node (SMF+PGW-C).

Supplementary Note 12.

The network node for network slice management according to any one of supplementary note 7 to 11, wherein the network node for network slice management is Network Slice Admission control function (NSACF).

Supplementary Note 13.

A method for a core network node comprising:

requesting the network node for a network slice management, to update the number of a user equipment (UE) registered to the network slice;

requesting the network node for network slice management, to update the number of a Protocol Data Unit (PDU) for a specific network slice; and receiving, from the network node for network slice management, information indicating failure related to the number of PDU update.

Supplementary Note 14.

The method according to supplementary note 13, further comprising invoking update information related to the number of UE to decrease the UE count.

Supplementary Note 15.

The method according to supplementary note 14, wherein the invoking update information related to the number of UE to decrease the UE count, is invoked based on the information indicating failure.

Supplementary Note 16.

The method according to any one of supplementary note 13 to 15, wherein the information indicating failure is received after the requesting the network node for network slice management the update the number of the UE and the requesting the network node for network slice management to update the number of PDU.

Supplementary Note 17.

The method according to any one of supplementary note 13 to 16, wherein the core network node is a combination of Session Management function node and PDN Gateway Control plane node (SMF+PGW-C).

Supplementary Note 18.

The method according to any one of supplementary note 13 to 17, wherein the network node for network slice management is Network Slice Admission control function (NSACF).

Supplementary Note 19.

A method for a network node for a network slice management comprising:

receiving a request, from a core network node, to update of the number of user equipment (UE) registered to the network slice;

receiving a request, from a core network node, to update the number of Protocol Data Unit (PDU) for a specific network slice; and sending, to a core network node, information indicating failure related to the number of PDU update.

Supplementary Note 20.

The method according to supplementary note 19, wherein the information indicating failure is sent to the core network node to invoke update information related to the number of UE to decrease the UE count.

Supplementary Note 21.

The method according to supplementary note 19 or 20, wherein the update information related to the number of UE to decrease the UE count is invoked based on the information indicating failure.

Supplementary Note 22.

The method according to any one of supplementary note 19 to 21, wherein the sending occurs after receiving the request to update of the number of UE and receiving the request to update the number of PDU.

Supplementary Note 23.

The network node for network slice management according to any one of supplementary note 7 to 10, wherein the core network node is a combination of Session Management function node and PDN Gateway Control plane node (SMF+PGW-C).

Supplementary Note 24.

The network node for network slice management according to any one of supplementary note 7 to 11, wherein the network node for network slice management is Network Slice Admission control function (NSACF).

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Indian provisional patent application No. 202111032117, filed on Jul. 16, 2021, the disclosure of which is incorporated herein in its entirety by reference.

REFERENCE SIGNS LIST

1 telecommunication system
3 UE
5 (R)AN node
7 core network
20 data network
31 transceiver circuit
32 antenna
33 controller
34 user interface
35 USIM
36 memory
51 transceiver circuit
52 antenna
53 network interface
54 controller
55 memory
60 RU
61 DU
62 CU
70 AMF
71 SMF
72 UPF
73 PCF

74 NEF
75 UDM
76 NWDAF
77 NSACF
361 operating system
362 communications control module
551 operating system
552 communications control module
601 transceiver circuit
602 antenna
603 network interface
604 controller
605 memory
611 transceiver circuit
612 network interface
613 controller
614 memory
621 transceiver circuit
622 network interface
623 controller
624 memory
701 transceiver circuit
702 network interface
703 controller
704 memory
711 transceiver circuit
712 network interface
713 controller
714 memory
751 transceiver circuit
752 network interface
753 controller
754 memory
771 transceiver circuit
772 network interface
773 controller
774 memory
3621 transceiver control module
5521 transceiver control module
6051 operating system
6052 communications control module
6141 operating system
6142 communications control module
6241 operating system
6242 communications control module
7041 operating system
7042 communications control module
7141 operating system
7142 communications control module
7541 operating system
7542 communications control module
7741 operating system
7742 communications control module
60521 transceiver control module
61421 transceiver control module
62421 transceiver control module
70421 transceiver control module
71421 transceiver control module
75421 transceiver control module
77421 transceiver control module

What is claimed is:

1. A first core network node comprising:

a memory; and at least one processor configured to access the memory and configured to:

request a second core network node to update a number of user equipments (UEs) registered to a network slice, wherein the second core network node is configured to manage the network slice;

request the second core network node to update a number of Protocol Data Unit (PDU) sessions for a specific network slice;

receive, from the second core network node, information indicating a failure related to an update of the number of PDU sessions; and based on the information indicating the failure related to the update of the number of PDU sessions, invoke an updating of information by the second core network node, wherein the update of the information decreases a UE count, and wherein the information is related to the number of UEs.

2. The first core network node according to claim 1, wherein the information indicating the failure is received after requesting the second core network node to update the number of the UEs and requesting the second core network node to update the number of PDU sessions.

3. The first core network node according to claim 1, wherein the first core network node comprises a combination of a session management function (SMF) node and a packet data network gateway control plane node (PGW-C).

4. The first core network node according to claim 1, wherein the second core network node comprises a network slice admission control function (NSACF).

5. A second core network node for network slice management, the second core network node comprising:

a memory; and at least one processor configured to access the memory and to:

receive a first request, from a first core network node, to update of a number of user equipments (UEs) registered to a network slice;

receive a second request, from the first core network node, to update a number of protocol data unit (PDU) sessions for a specific network slice;

send, to the first core network node, information indicating a failure related to an update of the number of PDU sessions; and decrease a UE count in response to a request from the first core network node that is sent based on the information indicating the failure related to the update of the number of PDU sessions.

6. The second core network node according to claim 5, wherein the at least one processor is further configured to access the memory and to send the information indicating the failure after receiving the request to update of the number of UEs and receiving the request to update the number of PDU sessions.

7. The second core network node according to claim 5, wherein the first core network node comprises a combination of session a management function (SMF) node and a packet data network plane node (PGW-C).

8. The second core network node according to claim 5, wherein the second core network node comprises a network slice admission control function (NSACF).

9. A method of operating a first core network node, the method comprising:

requesting a second core network node to update a number of user equipments (UEs) registered to a network slice, wherein the second core network node is configured to manage the network slice;

requesting the second core network node to update a number of protocol data unit (PDU) sessions for a specific network slice;

receiving, from the second core network node, information indicating a failure related to an update of the number of PDU sessions; and based on the information indicating the failure related to the update of the number of PDU sessions, invoking an updating of information by the second core network node, wherein the update of the information decreases a UE count, and wherein the information is related to the number of UEs.

10. The method according to claim 9, wherein the information indicating the failure is received after the requesting the second core network node to update the number of UEs and the requesting the second core network node to update the number of PDU sessions.

11. The method according to claim 9, wherein the first core network node comprises a combination of a session management function (SMF) node and a packet data network plane node (PGW-C).

12. The method according to claim 9, wherein the second core network node comprises a network slice admission control function (NSACF).

13. A method of operating a second core network node for network slice management, the method comprising:

receiving a first request, from a first core network node, to update a number of user equipments (UEs) registered to a network slice;

receiving a second request, from the first core network node, to update a number of protocol data unit (PDU) sessions for a specific network slice;

sending, to the first core network node, information indicating a failure-related to an update of the number of PDU sessions; and decreasing a UE count in response to a request from the first core network node that is sent based on the information indicating the failure related to the update of the number of PDU sessions.

* * * * *